(12) United States Patent
Smith

(10) Patent No.: US 9,529,851 B1
(45) Date of Patent: Dec. 27, 2016

(54) SERVER ARCHITECTURE FOR ELECTRONIC DATA QUALITY PROCESSING

(71) Applicant: Experian Information Solutions, Inc., Costa Mesa, CA (US)

(72) Inventor: Donna Meryl Smith, Irvine, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 21 days.

(21) Appl. No.: 14/555,444

(22) Filed: Nov. 26, 2014

Related U.S. Application Data

(60) Provisional application No. 61/910,892, filed on Dec. 2, 2013.

(51) Int. Cl.

| | |
|---|---|
| G06F 21/00 | (2013.01) |
| G06F 17/30 | (2006.01) |
| G06F 21/60 | (2013.01) |
| H04L 29/06 | (2006.01) |
| G06Q 10/10 | (2012.01) |
| G06F 17/22 | (2006.01) |

(52) U.S. Cl.
CPC ..... *G06F 17/30477* (2013.01); *G06F 17/2264* (2013.01); *G06F 17/30563* (2013.01); *G06F 17/30566* (2013.01); *G06F 17/30578* (2013.01); *G06F 21/602* (2013.01); *G06Q 10/10* (2013.01); *H04L 63/04* (2013.01)

(58) Field of Classification Search
CPC ................ H04L 63/0421; G06Q 10/10; G06F 17/30578; G06F 17/30477; G06F 21/602; G06F 17/30563; G06F 17/30566; G06F 17/2264

See application file for complete search history.

(56) References Cited

U.S. PATENT DOCUMENTS

| | | | |
|---|---|---|---|
| 4,163,290 | A | 7/1979 | Sutherlin et al. |
| 4,827,508 | A | 5/1989 | Shear |
| 4,868,570 | A | 9/1989 | Davis |
| 4,935,870 | A | 6/1990 | Burk, Jr. et al. |
| 4,989,141 | A | 1/1991 | Lyons et al. |
| 5,216,612 | A | 6/1993 | Cornett et al. |
| 5,247,575 | A | 9/1993 | Sprague et al. |

(Continued)

FOREIGN PATENT DOCUMENTS

| | | |
|---|---|---|
| EP | 0 419 889 | 4/1991 |
| EP | 0 458 698 | 11/1991 |

(Continued)

OTHER PUBLICATIONS

U.S. Appl. No. 12/705,489, filed Feb. 12, 2010, Bargoli et al.

(Continued)

*Primary Examiner* — Mohammad A Siddiqi
(74) *Attorney, Agent, or Firm* — Knobbe, Martens, Olson & Bear, LLP

(57) ABSTRACT

In one embodiment, a server architecture is disclosed that provides for processing and analyzing data received from data furnishers to evaluate quality of the provided data. The system may format the data received from the data furnishers into standardized form. Based on configuration information and rules for the data furnishers and the provided data, the system may analyze the data set to calculate one or more data quality indicators.

20 Claims, 16 Drawing Sheets

(56) References Cited

U.S. PATENT DOCUMENTS

| | | |
|---|---|---|
| 5,325,509 A | 6/1994 | Lautzenheiser |
| 5,341,429 A | 8/1994 | Stringer et al. |
| 5,528,701 A | 6/1996 | Aref |
| 5,555,409 A | 9/1996 | Leenstra, Sr. et al. |
| 5,590,038 A | 12/1996 | Pitroda |
| 5,621,201 A | 4/1997 | Langhans et al. |
| 5,629,982 A | 5/1997 | Micali |
| 5,630,070 A | 5/1997 | Dietrich et al. |
| 5,640,551 A | 6/1997 | Chu et al. |
| 5,640,577 A | 6/1997 | Scharmer |
| 5,655,129 A | 8/1997 | Ito |
| 5,659,731 A | 8/1997 | Gustafson |
| 5,666,528 A | 9/1997 | Thai |
| 5,692,107 A | 11/1997 | Simoudis et al. |
| 5,737,732 A | 4/1998 | Gibson et al. |
| 5,739,512 A | 4/1998 | Tognazzini |
| 5,748,098 A | 5/1998 | Grace |
| 5,754,632 A | 5/1998 | Smith |
| 5,754,939 A | 5/1998 | Herz et al. |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,822,750 A | 10/1998 | Jou et al. |
| 5,822,751 A | 10/1998 | Gray et al. |
| 5,825,884 A | 10/1998 | Zdepski et al. |
| 5,828,837 A | 10/1998 | Eikeland |
| 5,832,068 A | 11/1998 | Smith |
| 5,835,915 A | 11/1998 | Carr et al. |
| 5,844,218 A | 12/1998 | Kawan et al. |
| 5,881,131 A | 3/1999 | Farris et al. |
| 5,893,090 A | 4/1999 | Friedman et al. |
| 5,905,985 A | 5/1999 | Malloy et al. |
| 5,956,693 A | 9/1999 | Geerlings |
| 5,961,593 A | 10/1999 | Gabber et al. |
| 5,963,932 A | 10/1999 | Jakobsson et al. |
| 5,966,695 A | 10/1999 | Melchione et al. |
| 6,014,688 A | 1/2000 | Venkatraman et al. |
| 6,038,551 A | 3/2000 | Barlow et al. |
| 6,070,147 A | 5/2000 | Harms et al. |
| 6,073,106 A | 6/2000 | Rozen et al. |
| 6,073,140 A | 6/2000 | Morgan et al. |
| 6,085,242 A | 7/2000 | Chandra |
| 6,119,103 A | 9/2000 | Basch et al. |
| 6,121,901 A | 9/2000 | Welch et al. |
| 6,128,602 A | 10/2000 | Northington et al. |
| 6,128,624 A | 10/2000 | Papierniak et al. |
| 6,144,957 A | 11/2000 | Cohen et al. |
| 6,151,601 A | 11/2000 | Papierniak et al. |
| 6,157,707 A | 12/2000 | Baulier et al. |
| 6,157,927 A | 12/2000 | Schaefer et al. |
| 6,161,139 A | 12/2000 | Win et al. |
| 6,178,442 B1 | 1/2001 | Yamazaki |
| 6,202,053 B1 | 3/2001 | Christiansen et al. |
| 6,223,171 B1 | 4/2001 | Chaudhuri et al. |
| 6,253,202 B1 | 6/2001 | Gilmour |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,275,824 B1 | 8/2001 | O'Flaherty et al. |
| 6,304,869 B1 | 10/2001 | Moore et al. |
| 6,311,169 B2 | 10/2001 | Duhon |
| 6,339,769 B1 | 1/2002 | Cochrane et al. |
| 6,366,903 B1 | 4/2002 | Agrawal et al. |
| 6,397,197 B1 | 5/2002 | Gindlesperger |
| 6,405,173 B1 | 6/2002 | Honarvar et al. |
| 6,446,200 B1 | 9/2002 | Ball et al. |
| 6,448,980 B1 | 9/2002 | Kumar et al. |
| 6,453,353 B1 | 9/2002 | Win et al. |
| 6,457,012 B1 | 9/2002 | Jatkowski |
| 6,463,533 B1 | 10/2002 | Calamera et al. |
| 6,496,819 B1 | 12/2002 | Bello et al. |
| 6,496,931 B1 | 12/2002 | Rajchel et al. |
| 6,505,168 B1 | 1/2003 | Rothman et al. |
| 6,523,021 B1 | 2/2003 | Monberg et al. |
| 6,523,022 B1 | 2/2003 | Hobbs |
| 6,523,041 B1 | 2/2003 | Morgan et al. |
| 6,543,683 B2 | 4/2003 | Hoffman |
| 6,564,210 B1 | 5/2003 | Korda et al. |
| 6,574,623 B1 | 6/2003 | Leung et al. |
| 6,574,736 B1 | 6/2003 | Andrews |
| 6,581,059 B1 | 6/2003 | Barrett et al. |
| 6,601,173 B1 | 7/2003 | Mohler |
| 6,601,234 B1 | 7/2003 | Bowman-Amuah |
| 6,647,383 B1 | 11/2003 | August et al. |
| 6,651,220 B1 | 11/2003 | Penteroudakis et al. |
| 6,658,393 B1 | 12/2003 | Basch et al. |
| 6,708,166 B1 | 3/2004 | Dysart et al. |
| 6,714,944 B1 | 3/2004 | Shapiro et al. |
| 6,725,381 B1 | 4/2004 | Smith et al. |
| 6,738,748 B2 | 5/2004 | Wetzer |
| 6,748,426 B1 | 6/2004 | Shaffer et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,804,346 B1 | 10/2004 | Mewhinney |
| 6,804,701 B2 | 10/2004 | Muret et al. |
| 6,816,871 B2 | 11/2004 | Lee |
| 6,845,448 B1 | 1/2005 | Chaganti et al. |
| 6,850,895 B2 | 2/2005 | Brodersen et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,947,989 B2 | 9/2005 | Gullotta et al. |
| 6,950,858 B2 | 9/2005 | Ogami |
| 6,954,757 B2 | 10/2005 | Zargham et al. |
| 6,976,056 B1 | 12/2005 | Kumar |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,999,941 B1 | 2/2006 | Agarwal |
| 7,003,504 B1 | 2/2006 | Angus et al. |
| 7,016,907 B2 | 3/2006 | Boreham et al. |
| 7,028,001 B1 | 4/2006 | Muthuswamy et al. |
| 7,028,052 B2 | 4/2006 | Chapman et al. |
| 7,035,855 B1 | 4/2006 | Kilger et al. |
| 7,039,176 B2 | 5/2006 | Borodow et al. |
| 7,043,476 B2 | 5/2006 | Robson |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,062,475 B1 | 6/2006 | Szabo et al. |
| 7,069,240 B2 | 6/2006 | Spero et al. |
| 7,076,475 B2 | 7/2006 | Honarvar |
| 7,082,435 B1 | 7/2006 | Guzman et al. |
| 7,092,898 B1 | 8/2006 | Mattick et al. |
| 7,117,172 B1 | 10/2006 | Black |
| 7,124,144 B2 | 10/2006 | Christianson et al. |
| 7,133,935 B2 | 11/2006 | Hedy |
| 7,155,739 B2 | 12/2006 | Bari et al. |
| 7,167,907 B2 | 1/2007 | Shaffer et al. |
| 7,184,974 B2 | 2/2007 | Shishido |
| 7,185,016 B1 | 2/2007 | Rasmussen |
| 7,200,602 B2 | 4/2007 | Jonas |
| 7,219,107 B2 | 5/2007 | Beringer |
| 7,222,369 B2 | 5/2007 | Vering et al. |
| 7,234,160 B2 | 6/2007 | Vogel et al. |
| 7,240,059 B2 | 7/2007 | Bayliss et al. |
| 7,243,369 B2 | 7/2007 | Bhat et al. |
| 7,246,067 B2 | 7/2007 | Austin et al. |
| 7,249,048 B1 | 7/2007 | O'Flaherty |
| 7,272,591 B1 | 9/2007 | Ghazal et al. |
| 7,277,900 B1 | 10/2007 | Ganesh et al. |
| 7,315,837 B2 | 1/2008 | Sloan et al. |
| 7,328,233 B2 | 2/2008 | Salim et al. |
| 7,340,679 B2 | 3/2008 | Botscheck et al. |
| 7,346,703 B2 | 3/2008 | Cope |
| 7,366,694 B2 | 4/2008 | Lazerson |
| 7,367,011 B2 | 4/2008 | Ramsey et al. |
| 7,370,044 B2 | 5/2008 | Mulhern et al. |

(56) References Cited

U.S. PATENT DOCUMENTS

| | | |
|---|---|---|
| 7,373,335 B2 | 5/2008 | Cleghorn et al. |
| 7,376,603 B1 | 5/2008 | Mayr et al. |
| 7,383,215 B1 | 6/2008 | Navarro et al. |
| 7,383,988 B2 | 6/2008 | Slonecker, Jr. |
| 7,395,273 B2 | 7/2008 | Khan et al. |
| 7,403,942 B1 | 7/2008 | Bayliss |
| 7,421,322 B1 | 9/2008 | Silversmith et al. |
| 7,421,442 B2 | 9/2008 | Gelb et al. |
| 7,424,439 B1 | 9/2008 | Fayyad et al. |
| 7,433,864 B2 | 10/2008 | Malik |
| 7,451,113 B1 | 11/2008 | Kasower |
| 7,460,857 B2 | 12/2008 | Roach, Jr. |
| 7,467,127 B1 | 12/2008 | Baccash et al. |
| 7,467,401 B2 | 12/2008 | Cicchitto |
| 7,475,118 B2 | 1/2009 | Leiba et al. |
| 7,478,157 B2 | 1/2009 | Bohrer et al. |
| 7,483,842 B1 | 1/2009 | Fung et al. |
| 7,490,356 B2 | 2/2009 | Lieblich et al. |
| 7,505,938 B2 | 3/2009 | Lang et al. |
| 7,529,698 B2 | 5/2009 | Joao |
| 7,533,179 B2 | 5/2009 | Tarquini et al. |
| 7,536,346 B2 | 5/2009 | Aliffi et al. |
| 7,543,739 B2 | 6/2009 | Brown et al. |
| 7,546,266 B2 | 6/2009 | Beirne et al. |
| 7,546,271 B1 | 6/2009 | Chmielewski et al. |
| 7,552,089 B2 | 6/2009 | Bruer et al. |
| 7,556,192 B2 | 7/2009 | Wokaty, Jr. |
| 7,559,217 B2 | 7/2009 | Bass |
| 7,562,093 B2 | 7/2009 | Gelb et al. |
| 7,562,184 B2 | 7/2009 | Henmi et al. |
| 7,562,814 B1 | 7/2009 | Shao et al. |
| 7,571,473 B1 | 8/2009 | Boydstun et al. |
| 7,577,934 B2 | 8/2009 | Anonsen et al. |
| 7,584,126 B1 | 9/2009 | White |
| 7,584,146 B1 | 9/2009 | Duhon |
| 7,587,366 B2 | 9/2009 | Grim, III et al. |
| 7,593,889 B2 | 9/2009 | Raines et al. |
| 7,596,512 B1 | 9/2009 | Raines et al. |
| 7,596,716 B2 | 9/2009 | Frost et al. |
| 7,603,701 B2 | 10/2009 | Gaucas |
| 7,606,725 B2 | 10/2009 | Robertson et al. |
| 7,613,600 B2 | 11/2009 | Krane |
| 7,634,737 B2 | 12/2009 | Beringer et al. |
| 7,647,344 B2 | 1/2010 | Skurtovich, Jr. et al. |
| 7,653,592 B1 | 1/2010 | Flaxman et al. |
| 7,653,688 B2 | 1/2010 | Bittner |
| 7,668,840 B2 | 2/2010 | Bayliss et al. |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,676,751 B2 | 3/2010 | Allen et al. |
| 7,685,209 B1 | 3/2010 | Norton et al. |
| 7,689,505 B2 | 3/2010 | Kasower |
| 7,698,163 B2 | 4/2010 | Reed et al. |
| 7,698,445 B2 | 4/2010 | Fitzpatrick et al. |
| 7,707,059 B2 | 4/2010 | Reed et al. |
| 7,707,164 B2 | 4/2010 | Kapochunas et al. |
| 7,707,271 B2 | 4/2010 | Rudkin et al. |
| 7,711,635 B2 | 5/2010 | Steele et al. |
| 7,730,078 B2 | 6/2010 | Schwabe et al. |
| 7,739,139 B2 | 6/2010 | Robertson et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,765,166 B2 | 7/2010 | Beringer et al. |
| 7,765,311 B2 | 7/2010 | Itabashi et al. |
| 7,769,696 B2 | 8/2010 | Yoda |
| 7,774,270 B1 | 8/2010 | MacCloskey |
| 7,783,515 B1 | 8/2010 | Kumar et al. |
| 7,788,040 B2 | 8/2010 | Haskell et al. |
| 7,797,252 B2 | 9/2010 | Rosskamm et al. |
| 7,797,725 B2 | 9/2010 | Lunt et al. |
| 7,801,812 B2 | 9/2010 | Conlin et al. |
| 7,801,956 B1 | 9/2010 | Cumberbatch et al. |
| 7,810,036 B2 | 10/2010 | Bales et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,832,006 B2 | 11/2010 | Chen et al. |
| 7,836,111 B1 | 11/2010 | Shan |
| 7,841,008 B1 | 11/2010 | Cole et al. |
| 7,844,604 B2 | 11/2010 | Baio et al. |
| 7,853,518 B2 | 12/2010 | Cagan |
| 7,877,304 B1 | 1/2011 | Coulter |
| 7,908,242 B1 | 3/2011 | Achanta |
| 7,912,865 B2 | 3/2011 | Akerman et al. |
| 7,930,242 B2 | 4/2011 | Morris et al. |
| 7,975,299 B1 | 7/2011 | Balducci et al. |
| 7,983,932 B2 | 7/2011 | Kane |
| 7,991,688 B2 | 8/2011 | Phelan et al. |
| 7,991,901 B2 | 8/2011 | Tarquini et al. |
| 7,996,912 B2 | 8/2011 | Spalink et al. |
| 8,001,153 B2 | 8/2011 | Skurtovich, Jr. et al. |
| 8,001,235 B2 | 8/2011 | Russ et al. |
| 8,005,759 B2 | 8/2011 | Hirtenstein et al. |
| 8,024,264 B2 | 9/2011 | Chaudhuri et al. |
| 8,060,424 B2 | 11/2011 | Kasower |
| 8,065,233 B2 | 11/2011 | Lee et al. |
| 8,065,264 B1 | 11/2011 | Achanta |
| 8,095,458 B2 | 1/2012 | Peterson et al. |
| 8,099,341 B2 | 1/2012 | Varghese |
| 8,104,679 B2 | 1/2012 | Brown |
| 8,127,986 B1 | 3/2012 | Taylor et al. |
| 8,131,777 B2 | 3/2012 | McCullough |
| 8,161,104 B2 | 4/2012 | Tomkow |
| 8,175,889 B1 | 5/2012 | Girulat et al. |
| 8,201,257 B1 | 6/2012 | Andres et al. |
| 8,214,238 B1 | 7/2012 | Fairfield et al. |
| 8,224,723 B2 | 7/2012 | Bosch et al. |
| 8,234,498 B2 | 7/2012 | Britti et al. |
| 8,271,378 B2 | 9/2012 | Chaudhuri et al. |
| 8,280,805 B1 | 10/2012 | Abrahams et al. |
| 8,285,656 B1 | 10/2012 | Chang et al. |
| 8,296,229 B1 | 10/2012 | Yellin et al. |
| 8,312,033 B1 | 11/2012 | McMillan |
| 8,321,339 B2 | 11/2012 | Imrey et al. |
| 8,321,952 B2 | 11/2012 | Spalink et al. |
| 8,326,672 B2 | 12/2012 | Haggerty et al. |
| 8,364,518 B1 | 1/2013 | Blake et al. |
| 8,386,377 B1 | 2/2013 | Xiong et al. |
| 8,392,334 B2 | 3/2013 | Hirtenstein et al. |
| 8,458,074 B2 | 6/2013 | Showalter |
| 8,463,919 B2 | 6/2013 | Tarquini et al. |
| 8,468,198 B2 | 6/2013 | Tomkow |
| 8,478,674 B1 | 7/2013 | Kapczynski et al. |
| 8,498,930 B2 * | 7/2013 | Chung ............... G06Q 40/025 705/35 |
| 8,515,828 B1 | 8/2013 | Wolf et al. |
| 8,515,862 B2 | 8/2013 | Zhang et al. |
| 8,560,434 B2 | 10/2013 | Morris et al. |
| 8,560,436 B2 | 10/2013 | Ingram et al. |
| 8,566,141 B1 | 10/2013 | Nagdev et al. |
| 8,572,083 B1 | 10/2013 | Snell et al. |
| 8,583,593 B1 | 11/2013 | Achanta |
| 8,606,666 B1 | 12/2013 | Courbage et al. |
| 8,639,616 B1 | 1/2014 | Rolenaitis et al. |
| 8,639,920 B2 | 1/2014 | Stack et al. |
| 8,705,718 B2 | 4/2014 | Baniak et al. |
| 8,725,613 B1 | 5/2014 | Celka et al. |
| 8,732,004 B1 * | 5/2014 | Ramos ............... G06Q 30/0251 705/14.1 |
| 8,738,515 B2 | 5/2014 | Chaudhuri et al. |
| 8,738,516 B1 | 5/2014 | Dean et al. |
| 8,768,914 B2 | 7/2014 | Scriffignano et al. |
| 8,775,299 B2 | 7/2014 | Achanta et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,949,981 B1 | 2/2015 | Trollope et al. |
| 8,954,459 B1 | 2/2015 | McMillan et al. |
| 8,966,649 B2 | 2/2015 | Stack et al. |
| 8,972,400 B1 | 3/2015 | Kapczynski et al. |

(56) References Cited

U.S. PATENT DOCUMENTS

| | | |
|---|---|---|
| 9,147,042 B1 | 9/2015 | Haller et al. |
| 9,152,727 B1 | 10/2015 | Balducci et al. |
| 9,268,803 B2 | 2/2016 | Kapochunas et al. |
| 9,342,783 B1 | 5/2016 | Chang et al. |
| 2001/0000536 A1 | 4/2001 | Tarin |
| 2001/0029470 A1 | 10/2001 | Schultz et al. |
| 2001/0029482 A1 | 10/2001 | Tealdi et al. |
| 2001/0037332 A1 | 11/2001 | Miller et al. |
| 2001/0039532 A1 | 11/2001 | Coleman, Jr. et al. |
| 2001/0049274 A1 | 12/2001 | Degraeve |
| 2001/0049620 A1 | 12/2001 | Blasko |
| 2002/0004736 A1 | 1/2002 | Roundtree et al. |
| 2002/0010664 A1 | 1/2002 | Rabideau et al. |
| 2002/0010701 A1 | 1/2002 | Kosciuszko et al. |
| 2002/0013827 A1 | 1/2002 | Edstrom et al. |
| 2002/0026507 A1 | 2/2002 | Sears et al. |
| 2002/0026519 A1 | 2/2002 | Itabashi et al. |
| 2002/0033846 A1 | 3/2002 | Balasubramanian et al. |
| 2002/0049701 A1 | 4/2002 | Nabe et al. |
| 2002/0049738 A1 | 4/2002 | Epstein |
| 2002/0052884 A1 | 5/2002 | Farber et al. |
| 2002/0069122 A1 | 6/2002 | Yun et al. |
| 2002/0077964 A1 | 6/2002 | Brody et al. |
| 2002/0091650 A1 | 7/2002 | Ellis |
| 2002/0091706 A1 | 7/2002 | Anderson et al. |
| 2002/0099628 A1 | 7/2002 | Takaoka et al. |
| 2002/0099824 A1 | 7/2002 | Bender et al. |
| 2002/0099936 A1 | 7/2002 | Kou et al. |
| 2002/0103809 A1 | 8/2002 | Starzl et al. |
| 2002/0103933 A1 | 8/2002 | Garon et al. |
| 2002/0111816 A1 | 8/2002 | Lortscher et al. |
| 2002/0111910 A1 | 8/2002 | Walsh |
| 2002/0120757 A1 | 8/2002 | Sutherland et al. |
| 2002/0128962 A1 | 9/2002 | Kasower |
| 2002/0131565 A1 | 9/2002 | Scheuring et al. |
| 2002/0133504 A1 | 9/2002 | Vlahos et al. |
| 2002/0138297 A1 | 9/2002 | Lee |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0156676 A1 | 10/2002 | Ahrens et al. |
| 2002/0161496 A1 | 10/2002 | Yamaki |
| 2002/0161664 A1 | 10/2002 | Shaya et al. |
| 2002/0165757 A1 | 11/2002 | Lisser |
| 2002/0169747 A1 | 11/2002 | Chapman et al. |
| 2002/0173984 A1 | 11/2002 | Robertson et al. |
| 2002/0184255 A1 | 12/2002 | Edd et al. |
| 2002/0188544 A1 | 12/2002 | Wizon et al. |
| 2002/0198800 A1 | 12/2002 | Shamrakov |
| 2002/0198824 A1 | 12/2002 | Cook |
| 2003/0002671 A1 | 1/2003 | Inchalik et al. |
| 2003/0009418 A1 | 1/2003 | Green et al. |
| 2003/0018549 A1 | 1/2003 | Fei et al. |
| 2003/0018578 A1 | 1/2003 | Schultz |
| 2003/0023531 A1 | 1/2003 | Fergusson |
| 2003/0041050 A1 | 2/2003 | Smith et al. |
| 2003/0046311 A1 | 3/2003 | Baidya et al. |
| 2003/0050882 A1 | 3/2003 | Degen et al. |
| 2003/0055931 A1* | 3/2003 | Cravo De Almeida ............ H04L 63/04 709/223 |
| 2003/0069839 A1 | 4/2003 | Whittington et al. |
| 2003/0069943 A1 | 4/2003 | Bahrs et al. |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105728 A1 | 6/2003 | Yano et al. |
| 2003/0105733 A1 | 6/2003 | Boreham et al. |
| 2003/0105742 A1 | 6/2003 | Boreham et al. |
| 2003/0153299 A1 | 8/2003 | Perfit et al. |
| 2003/0158749 A1* | 8/2003 | Olchanski ............ G06Q 10/06 705/2 |
| 2003/0158776 A1 | 8/2003 | Landesmann |
| 2003/0163513 A1 | 8/2003 | Schaeck et al. |
| 2003/0171942 A1 | 9/2003 | Gaito |
| 2003/0191731 A1 | 10/2003 | Stewart et al. |
| 2003/0200151 A1 | 10/2003 | Ellenson et al. |
| 2003/0204429 A1 | 10/2003 | Botscheck et al. |
| 2003/0212654 A1 | 11/2003 | Harper et al. |
| 2003/0229892 A1 | 12/2003 | Sardera |
| 2004/0006488 A1 | 1/2004 | Fitall et al. |
| 2004/0010458 A1 | 1/2004 | Friedman |
| 2004/0019799 A1 | 1/2004 | Vering et al. |
| 2004/0030649 A1 | 2/2004 | Nelson et al. |
| 2004/0044673 A1 | 3/2004 | Brady et al. |
| 2004/0083215 A1 | 4/2004 | de Jong |
| 2004/0088237 A1 | 5/2004 | Moenickheim et al. |
| 2004/0088255 A1 | 5/2004 | Zielke et al. |
| 2004/0098625 A1 | 5/2004 | Lagadec et al. |
| 2004/0103147 A1 | 5/2004 | Flesher et al. |
| 2004/0107250 A1 | 6/2004 | Marciano |
| 2004/0111359 A1 | 6/2004 | Hudock |
| 2004/0117358 A1 | 6/2004 | Von Kaenel et al. |
| 2004/0122696 A1 | 6/2004 | Beringer |
| 2004/0128150 A1 | 7/2004 | Lundegren |
| 2004/0128156 A1 | 7/2004 | Beringer et al. |
| 2004/0128230 A1 | 7/2004 | Oppenheimer et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0139025 A1 | 7/2004 | Coleman |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153330 A1 | 8/2004 | Miller et al. |
| 2004/0153448 A1 | 8/2004 | Cheng et al. |
| 2004/0153521 A1 | 8/2004 | Kogo |
| 2004/0176995 A1 | 9/2004 | Fusz |
| 2004/0193538 A1 | 9/2004 | Raines |
| 2004/0199456 A1 | 10/2004 | Flint et al. |
| 2004/0199789 A1 | 10/2004 | Shaw et al. |
| 2004/0204948 A1 | 10/2004 | Singletary et al. |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0221043 A1 | 11/2004 | Su et al. |
| 2004/0225099 A1 | 11/2004 | Hohberg et al. |
| 2004/0225594 A1 | 11/2004 | Nolan, III et al. |
| 2004/0225596 A1 | 11/2004 | Kemper et al. |
| 2004/0225643 A1 | 11/2004 | Alpha et al. |
| 2004/0230534 A1 | 11/2004 | McGough |
| 2004/0243588 A1* | 12/2004 | Tanner ............ G06F 17/30545 |
| 2004/0254935 A1 | 12/2004 | Chagoly et al. |
| 2004/0267714 A1 | 12/2004 | Frid et al. |
| 2005/0005168 A1 | 1/2005 | Dick |
| 2005/0010513 A1 | 1/2005 | Duckworth et al. |
| 2005/0010555 A1 | 1/2005 | Gallivan |
| 2005/0027995 A1 | 2/2005 | Menschik et al. |
| 2005/0038737 A1 | 2/2005 | Norris |
| 2005/0049991 A1 | 3/2005 | Aggarwal et al. |
| 2005/0055231 A1* | 3/2005 | Lee ................ G06Q 10/1053 705/319 |
| 2005/0060332 A1 | 3/2005 | Bernstein et al. |
| 2005/0071328 A1 | 3/2005 | Lawrence |
| 2005/0091164 A1 | 4/2005 | Varble |
| 2005/0097039 A1 | 5/2005 | Kulcsar et al. |
| 2005/0102180 A1 | 5/2005 | Gailey et al. |
| 2005/0108396 A1 | 5/2005 | Bittner |
| 2005/0108631 A1 | 5/2005 | Amorin et al. |
| 2005/0113991 A1 | 5/2005 | Rogers et al. |
| 2005/0114335 A1 | 5/2005 | Wesinger et al. |
| 2005/0114344 A1 | 5/2005 | Wesinger et al. |
| 2005/0114345 A1 | 5/2005 | Wesinger et al. |
| 2005/0137899 A1 | 6/2005 | Davies et al. |
| 2005/0144452 A1 | 6/2005 | Lynch et al. |
| 2005/0154664 A1 | 7/2005 | Guy et al. |
| 2005/0154769 A1 | 7/2005 | Eckart et al. |
| 2005/0187948 A1 | 8/2005 | Monitzer et al. |
| 2005/0192008 A1 | 9/2005 | Desai et al. |
| 2005/0208461 A1 | 9/2005 | Krebs et al. |
| 2005/0226224 A1 | 10/2005 | Lee et al. |
| 2005/0246338 A1 | 11/2005 | Bird |
| 2005/0257250 A1 | 11/2005 | Mitchell et al. |

(56) References Cited

U.S. PATENT DOCUMENTS

| | | |
|---|---|---|
| 2005/0262158 A1 | 11/2005 | Sauermann |
| 2005/0273849 A1 | 12/2005 | Araujo et al. |
| 2005/0288998 A1 | 12/2005 | Verma et al. |
| 2006/0015425 A1 | 1/2006 | Brooks |
| 2006/0020611 A1 | 1/2006 | Gilbert et al. |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041670 A1 | 2/2006 | Musseleck et al. |
| 2006/0074991 A1 | 4/2006 | Lussier et al. |
| 2006/0079211 A1 | 4/2006 | Degraeve |
| 2006/0080233 A1 | 4/2006 | Mendelovich et al. |
| 2006/0080251 A1 | 4/2006 | Fried et al. |
| 2006/0085361 A1 | 4/2006 | Hoerle et al. |
| 2006/0085454 A1 | 4/2006 | Blegen et al. |
| 2006/0129419 A1 | 6/2006 | Flaxer et al. |
| 2006/0136330 A1 | 6/2006 | DeRoy et al. |
| 2006/0136595 A1 | 6/2006 | Satyavolu |
| 2006/0149674 A1 | 7/2006 | Cook et al. |
| 2006/0155573 A1 | 7/2006 | Hartunian |
| 2006/0155780 A1 | 7/2006 | Sakairi et al. |
| 2006/0161554 A1 | 7/2006 | Lucovsky et al. |
| 2006/0179050 A1 | 8/2006 | Giang et al. |
| 2006/0184440 A1 | 8/2006 | Britti et al. |
| 2006/0184585 A1 | 8/2006 | Grear et al. |
| 2006/0195688 A1 | 8/2006 | Drissi et al. |
| 2006/0235935 A1 | 10/2006 | Ng |
| 2006/0242047 A1 | 10/2006 | Haggerty et al. |
| 2006/0276171 A1 | 12/2006 | Pousti |
| 2006/0277089 A1 | 12/2006 | Hubbard et al. |
| 2006/0277092 A1 | 12/2006 | Williams |
| 2006/0277141 A1 | 12/2006 | Palmer |
| 2006/0282359 A1 | 12/2006 | Nobili et al. |
| 2006/0282429 A1 | 12/2006 | Hernandez-Sherrington et al. |
| 2006/0282819 A1 | 12/2006 | Graham et al. |
| 2006/0288090 A1 | 12/2006 | Kraft |
| 2006/0293979 A1 | 12/2006 | Cash et al. |
| 2006/0294199 A1 | 12/2006 | Bertholf |
| 2007/0011020 A1 | 1/2007 | Martin |
| 2007/0022141 A1 | 1/2007 | Singleton et al. |
| 2007/0022297 A1 | 1/2007 | Britti et al. |
| 2007/0027778 A1 | 2/2007 | Schellhammer et al. |
| 2007/0030282 A1 | 2/2007 | Cash et al. |
| 2007/0038483 A1 | 2/2007 | Wood |
| 2007/0038497 A1 | 2/2007 | Britti et al. |
| 2007/0047714 A1 | 3/2007 | Baniak et al. |
| 2007/0067437 A1 | 3/2007 | Sindambiwe |
| 2007/0094230 A1 | 4/2007 | Subramaniam et al. |
| 2007/0094241 A1 | 4/2007 | M. Blackwell et al. |
| 2007/0094264 A1 | 4/2007 | Nair |
| 2007/0112668 A1 | 5/2007 | Celano et al. |
| 2007/0118393 A1 | 5/2007 | Rosen et al. |
| 2007/0130070 A1* | 6/2007 | Williams .......... G06Q 30/02 705/50 |
| 2007/0156554 A1 | 7/2007 | Nikoley et al. |
| 2007/0156589 A1 | 7/2007 | Zimler et al. |
| 2007/0185797 A1 | 8/2007 | Robinson |
| 2007/0204338 A1 | 8/2007 | Aiello et al. |
| 2007/0208640 A1 | 9/2007 | Banasiak et al. |
| 2007/0214000 A1 | 9/2007 | Shahrabi et al. |
| 2007/0220611 A1 | 9/2007 | Socolow et al. |
| 2007/0226010 A1 | 9/2007 | Larsen |
| 2007/0226093 A1 | 9/2007 | Chan et al. |
| 2007/0226129 A1 | 9/2007 | Liao et al. |
| 2007/0244782 A1 | 10/2007 | Chimento |
| 2007/0250441 A1 | 10/2007 | Paulsen et al. |
| 2007/0250459 A1 | 10/2007 | Schwarz et al. |
| 2007/0261114 A1 | 11/2007 | Pomerantsev |
| 2007/0282730 A1 | 12/2007 | Carpenter et al. |
| 2007/0282736 A1 | 12/2007 | Conlin et al. |
| 2007/0288360 A1 | 12/2007 | Seeklus |
| 2007/0299759 A1 | 12/2007 | Kelly |
| 2008/0010206 A1 | 1/2008 | Coleman |
| 2008/0021804 A1 | 1/2008 | Deckoff |
| 2008/0027858 A1 | 1/2008 | Benson |
| 2008/0033742 A1 | 2/2008 | Bernasconi |
| 2008/0033956 A1 | 2/2008 | Saha et al. |
| 2008/0052244 A1 | 2/2008 | Tsuei et al. |
| 2008/0059224 A1 | 3/2008 | Schechter |
| 2008/0059449 A1 | 3/2008 | Webster et al. |
| 2008/0072316 A1 | 3/2008 | Chang et al. |
| 2008/0082536 A1 | 4/2008 | Schwabe et al. |
| 2008/0109875 A1 | 5/2008 | Kraft |
| 2008/0115191 A1 | 5/2008 | Kim et al. |
| 2008/0120569 A1 | 5/2008 | Mann et al. |
| 2008/0177655 A1 | 7/2008 | Zalik |
| 2008/0183504 A1 | 7/2008 | Highley |
| 2008/0183564 A1 | 7/2008 | Tien et al. |
| 2008/0184270 A1 | 7/2008 | Cole et al. |
| 2008/0201401 A1 | 8/2008 | Pugh et al. |
| 2008/0205655 A1 | 8/2008 | Wilkins et al. |
| 2008/0208735 A1 | 8/2008 | Balet et al. |
| 2008/0208873 A1 | 8/2008 | Boehmer |
| 2008/0249869 A1 | 10/2008 | Angell et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0288283 A1 | 11/2008 | Baldwin, Jr. et al. |
| 2008/0301016 A1 | 12/2008 | Durvasula et al. |
| 2008/0301188 A1 | 12/2008 | O'Hara |
| 2008/0306750 A1 | 12/2008 | Wunder et al. |
| 2008/0312969 A1 | 12/2008 | Raines et al. |
| 2008/0319889 A1 | 12/2008 | Hammad |
| 2008/0320575 A1 | 12/2008 | Gelb et al. |
| 2009/0006475 A1 | 1/2009 | Udezue et al. |
| 2009/0018996 A1 | 1/2009 | Hunt et al. |
| 2009/0024428 A1 | 1/2009 | Hudock, Jr. |
| 2009/0024505 A1 | 1/2009 | Patel et al. |
| 2009/0031426 A1 | 1/2009 | Dal Lago et al. |
| 2009/0043691 A1 | 2/2009 | Kasower |
| 2009/0048877 A1 | 2/2009 | Binns et al. |
| 2009/0055894 A1 | 2/2009 | Lorsch |
| 2009/0060343 A1 | 3/2009 | Rosca |
| 2009/0094237 A1 | 4/2009 | Churi et al. |
| 2009/0094674 A1 | 4/2009 | Schwartz et al. |
| 2009/0106846 A1 | 4/2009 | Dupray et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0132347 A1 | 5/2009 | Anderson et al. |
| 2009/0138335 A1 | 5/2009 | Lieberman |
| 2009/0144102 A1 | 6/2009 | Lopez |
| 2009/0150166 A1 | 6/2009 | Leite et al. |
| 2009/0150238 A1 | 6/2009 | Marsh et al. |
| 2009/0164232 A1 | 6/2009 | Chmielewski et al. |
| 2009/0164380 A1 | 6/2009 | Brown |
| 2009/0183259 A1 | 7/2009 | Rinek et al. |
| 2009/0210807 A1 | 8/2009 | Xiao et al. |
| 2009/0216640 A1 | 8/2009 | Masi |
| 2009/0228918 A1 | 9/2009 | Rolff et al. |
| 2009/0234665 A1 | 9/2009 | Conkel |
| 2009/0234876 A1 | 9/2009 | Schigel et al. |
| 2009/0240609 A1 | 9/2009 | Cho et al. |
| 2009/0249440 A1 | 10/2009 | Platt et al. |
| 2009/0254375 A1 | 10/2009 | Martinez et al. |
| 2009/0254656 A1 | 10/2009 | Vignisson et al. |
| 2009/0254971 A1 | 10/2009 | Herz et al. |
| 2009/0271265 A1 | 10/2009 | Lay et al. |
| 2009/0313049 A1 | 12/2009 | Joao et al. |
| 2009/0313562 A1 | 12/2009 | Appleyard et al. |
| 2009/0327120 A1 | 12/2009 | Eze et al. |
| 2009/0328173 A1 | 12/2009 | Jakobson et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0030578 A1 | 2/2010 | Siddique et al. |
| 2010/0030677 A1 | 2/2010 | Melik-Aslanian et al. |
| 2010/0042583 A1 | 2/2010 | Gervais |
| 2010/0049803 A1 | 2/2010 | Ogilvie et al. |
| 2010/0094704 A1 | 4/2010 | Subramanian et al. |
| 2010/0094758 A1 | 4/2010 | Chamberlain et al. |
| 2010/0114724 A1 | 5/2010 | Ghosh et al. |
| 2010/0145836 A1 | 6/2010 | Baker et al. |
| 2010/0169159 A1 | 7/2010 | Rose et al. |

(56) References Cited

U.S. PATENT DOCUMENTS

| | | |
|---|---|---|
| 2010/0169264 A1 | 7/2010 | O'Sullivan |
| 2010/0185546 A1 | 7/2010 | Pollard |
| 2010/0188684 A1 | 7/2010 | Kumara |
| 2010/0205076 A1 | 8/2010 | Parson et al. |
| 2010/0211445 A1 | 8/2010 | Bodington |
| 2010/0211636 A1 | 8/2010 | Starkenburg et al. |
| 2010/0217837 A1 | 8/2010 | Ansari et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0268660 A1 | 10/2010 | Ekdahl |
| 2010/0293090 A1 | 11/2010 | Domenikos et al. |
| 2011/0009707 A1 | 1/2011 | Kaundinya et al. |
| 2011/0016042 A1 | 1/2011 | Cho et al. |
| 2011/0023115 A1 | 1/2011 | Wright |
| 2011/0078073 A1 | 3/2011 | Annappindi et al. |
| 2011/0113084 A1 | 5/2011 | Ramnani |
| 2011/0113086 A1 | 5/2011 | Long et al. |
| 2011/0125595 A1 | 5/2011 | Neal et al. |
| 2011/0126275 A1 | 5/2011 | Anderson et al. |
| 2011/0137760 A1 | 6/2011 | Rudie et al. |
| 2011/0137789 A1 | 6/2011 | Kortina et al. |
| 2011/0142213 A1 | 6/2011 | Baniak et al. |
| 2011/0161218 A1 | 6/2011 | Swift |
| 2011/0164746 A1 | 7/2011 | Nice et al. |
| 2011/0166988 A1 | 7/2011 | Coulter |
| 2011/0178899 A1 | 7/2011 | Huszar |
| 2011/0179139 A1 | 7/2011 | Starkenburg et al. |
| 2011/0184838 A1 | 7/2011 | Winters et al. |
| 2011/0196791 A1 | 8/2011 | Dominguez |
| 2011/0202474 A1 | 8/2011 | Mele et al. |
| 2011/0211445 A1 | 9/2011 | Chen |
| 2011/0219421 A1 | 9/2011 | Ullman et al. |
| 2011/0238566 A1 | 9/2011 | Santos |
| 2011/0258050 A1 | 10/2011 | Chan et al. |
| 2011/0264566 A1 | 10/2011 | Brown |
| 2012/0011056 A1 | 1/2012 | Ward et al. |
| 2012/0029956 A1 | 2/2012 | Ghosh et al. |
| 2012/0030216 A1 | 2/2012 | Churi et al. |
| 2012/0030771 A1 | 2/2012 | Pierson et al. |
| 2012/0054592 A1 | 3/2012 | Jaffe et al. |
| 2012/0072464 A1 | 3/2012 | Cohen |
| 2012/0078932 A1 | 3/2012 | Skurtovich, Jr. et al. |
| 2012/0101939 A1 | 4/2012 | Kasower |
| 2012/0106801 A1 | 5/2012 | Jackson |
| 2012/0110467 A1 | 5/2012 | Blake et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0158654 A1 | 6/2012 | Behren et al. |
| 2012/0173339 A1 | 7/2012 | Flynt et al. |
| 2012/0179536 A1 | 7/2012 | Kalb et al. |
| 2012/0198556 A1 | 8/2012 | Patel et al. |
| 2012/0215682 A1 | 8/2012 | Lent et al. |
| 2012/0216125 A1 | 8/2012 | Pierce |
| 2012/0226916 A1 | 9/2012 | Hahn et al. |
| 2012/0265607 A1 | 10/2012 | Belwadi |
| 2012/0290660 A1 | 11/2012 | Rao et al. |
| 2013/0031109 A1 | 1/2013 | Routson et al. |
| 2013/0125010 A1 | 5/2013 | Strandell |
| 2013/0132151 A1 | 5/2013 | Stibel et al. |
| 2013/0173481 A1 | 7/2013 | Hirtenstein et al. |
| 2013/0185293 A1 | 7/2013 | Boback |
| 2013/0226783 A1* | 8/2013 | Haggerty ............... G06Q 40/02 |
| | | 705/38 |
| 2013/0268357 A1 | 10/2013 | Heath |
| 2013/0279676 A1 | 10/2013 | Baniak et al. |
| 2013/0293363 A1 | 11/2013 | Plymouth |
| 2013/0332338 A1 | 12/2013 | Yan et al. |
| 2014/0025562 A1* | 1/2014 | Rothrock ............ G06Q 40/025 |
| | | 705/38 |
| 2014/0032265 A1 | 1/2014 | Paprocki et al. |
| 2014/0032300 A1 | 1/2014 | Zhang et al. |
| 2014/0040182 A1* | 2/2014 | Gilder ............... G06F 17/30578 |
| | | 707/602 |
| 2014/0136422 A1 | 5/2014 | Jung et al. |
| 2014/0164112 A1 | 6/2014 | Kala |
| 2014/0164519 A1 | 6/2014 | Shah |
| 2014/0244353 A1 | 8/2014 | Winters |
| 2014/0279329 A1 | 9/2014 | Dancel |
| 2015/0326580 A1 | 11/2015 | McMillan et al. |

FOREIGN PATENT DOCUMENTS

| | | |
|---|---|---|
| EP | 0 559 358 | 9/1993 |
| EP | 0 977 128 | 2/2000 |
| EP | 0 772 836 | 12/2001 |
| EP | 1 850 278 | 10/2007 |
| GB | 1 322 809 | 7/1973 |
| JP | 10-222559 | 8/1998 |
| JP | 10-261009 | 9/1998 |
| JP | 10-293732 | 11/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| RU | 2 181 216 | 4/2002 |
| WO | WO 95/34155 | 12/1995 |
| WO | WO 96/00945 | 1/1996 |
| WO | WO 98/41931 | 9/1998 |
| WO | WO 98/41932 | 9/1998 |
| WO | WO 98/41933 | 9/1998 |
| WO | WO 98/49643 | 11/1998 |
| WO | WO 99/17225 | 4/1999 |
| WO | WO 99/17226 | 4/1999 |
| WO | WO 99/38094 | 7/1999 |
| WO | WO 00/04465 | 1/2000 |
| WO | WO 00/28441 | 5/2000 |
| WO | WO 00/55778 | 9/2000 |
| WO | WO 00/65469 | 11/2000 |
| WO | WO 01/09752 | 2/2001 |
| WO | WO 01/09792 | 2/2001 |
| WO | WO 01/10090 | 2/2001 |
| WO | WO 01/84281 | 11/2001 |
| WO | WO 2004/031986 | 4/2004 |
| WO | WO 2004/088464 | 10/2004 |
| WO | WO 2004/114160 | 12/2004 |
| WO | WO 2006/050278 | 5/2006 |
| WO | WO 2008/022289 | 2/2008 |
| WO | WO 2008/042614 | 4/2008 |
| WO | WO 2008/054403 | 5/2008 |
| WO | WO 2009/117518 | 9/2009 |
| WO | WO 2010/132492 | 11/2010 |
| WO | WO 2013/009920 | 1/2013 |
| WO | WO 2014/018900 | 1/2014 |

OTHER PUBLICATIONS

U.S. Appl. No. 12/705,511, filed Feb. 12, 2010, Bargoli et al.

Actuate, "Delivering Enterprise Information for Corporate Portals", White Paper, 2004, pp. 1-7.

Akl, Selim G., "Digital Signatures: A Tutorial Survey," Computer, Feb. 1983, pp. 15-24.

Aktas et al., "Personalizing PageRank Based on Domain Profiles", WEBKDD workshop: Webmining and Web Usage Analysis, Aug. 22, 2004, pp. 83-90.

Aktas et al., "Using Hyperlink Features to Personalize Web Search", WEBKDD workshop: Webmining and Web Usage Analysis, Aug. 2004.

(56) References Cited

OTHER PUBLICATIONS

Bitran et al., "Mailing Decisions in Catalog Sales Industry", Management Science (JSTOR), vol. 42, No. 9, pp. 1364-1381, Sep. 1996.
Brick, et al. "Unit and Item Response, Weighting, and Imputation Procedures in the 1993 National Household Education Survey (NHES:93)" U.S. Department of Education. National Center for Education Statistics, Working Paper No. 97-05, Washington, D.C., pp. 30, Feb. 1997.
Burr Ph.D., al., et al "Utility Payments as Alternative Credit Data: A Reality Check", Asset Builders of America, Inc., Oct. 5, 2006, pp. 1-18, Washington, D.C.
Buxfer, http://www.buxfer.com/ printed Feb. 5, 2014 in 1 page.
Cáceres, et al., "Measurement and Analysis of IP Network Usage and Behavior", IEEE Communications Magazine, pp. 144-151, May 2000.
Census Geography, Excerpted from the Geographic Reference Manual, Nov. 1994, pp. 5.
Check, http://check.me/ printed Feb. 5, 2014 in 3 pages.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003.
Cohen et al., "Optimizer: IBM's Multi Echelon Inventory System for Managing Service Logistics", Interfaces, vol. 20, pp. 65-82, Jan.-Feb. 1990.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Davies, Donald W., "Applying the RSA Digital Signature to Electronic Mail," Computer, Feb. 1983, pp. 55-62.
"Debt Settlement: Watch Video on how to Pay Your Debt Faster", http://www.debtconsolidationcare.com/debt-settlement.html printed Jan. 9, 2013 in 6 pages.
Elmasri et al., "Fundamentals of Database Systems, Third Edition (Excerpts)", Jun. 2000, pp. 253, 261, 268-270, 278-280, 585, 595.
Ettorre, "Paul Kahn on Exceptional Marketing," Management Review, vol. 83, No. 11, Nov. 1994, pp. 48-51.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, 2009, pp. 164.
Experian: Mosaic United Kingdom, Brochure, Jun. 2009, pp. 24.
Experian: Mosaic UK—Optimise the Value of Your Customers and Locations, Now and in the Future, Brochure, Jun. 2010, pp. 24.
Experian: Mosaic UK—Unique Consumer Classification Based on In-Depth Demographic Data, as printed from http://www.experian.co.uk/business-strategies/mosaic-uk.html, Jul. 30, 2012, pp. 2.
Experian: Mosaic USA, Brochure, May 2009, pp. 14.
Experian: Mosaic USA—Consumer Lifestyle Segmentation [Data Card], Dec. 2009, pp. 2.
Experian: Public Sector, as printed form http://publicsector.experian.co.uk/Products/Mosaicpublicsector.aspx, 2012, pp. 2.
Experian, "Experian Rental Payment Data," http://www.experian.com/rentbureau/rental-data.html printed Nov. 22, 2013 in 2 pages.
Fenner, Peter, "Mobil Address Management and Billing for Personal Communications", 1st International Conference on Universal Personal Communications, 1992, ICUPC '92 Proceedings, pp. 253-257.
"Fictitious Business Name Records", Westlaw Database Directory, http://directoy.westlaw.com/scope/default.asp?db=FBN-ALL&RS-W&VR=2.0 as printed Dec. 17, 2009, pp. 5.
Fisher, Joseph, "Access to Fair Credit Reports: Current Practices and Proposed Legislation," American Business Law Journal, Fall 1981, vol. 19, No. 3, p. 319.
Garcia-Molina, "Database Systems: The Complete Book", Prentice Hall, 2002, pp. 713-715.
"GLBA Compliance and FFIEC Compliance" http://www.trustwave.com/financial-services.php printed Apr. 8, 2013 in 1 page.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield, Robert B. et al., "Managing Component Life Cycles in Dynamic Technological Environments", International Journal of Purchasing and Materials Management, Tempe, vol. 30, No. 2, pp. 20-28, Spring 1994, ProQuest ID 590096.
Herron, Janna, "Social Media-Based Credit Score?", http://www.bankrate.com/financing/credit-cards/social-media-based-credit-score/, posted Score Friday, Jan. 13, 2012, printed Nov. 22, 2013 in 2 pages.
Ideon, Credit-Card Registry that Bellyflopped this Year, Is Drawing some Bottom-Fishers, The Wall Street Journal, Aug. 21, 1995, pp. C2.
Inderfurth et al., "Decision Support for Spare Parts Acquisition in Post Product Life Cycle", Central European Journal of Operations Research, vol. 16, pp. 17-42, 2008 [Initially published online Dec. 21, 2007].
"Intelligent Miner Applications Guide", IBM Corp., Apr. 2, 1999, Chapters 4-7, pp. 33-132.
"Japan's JAAI system appraises used cars over internet", Asia Pulse, Mar. 3, 2000.
Jaro, Matthew A., "Probabilistic Linkage of Large Public Health Data Files," Statistics in Medicine,1995, vol. 14, pp. 491-498.
Käki, Anssi, "Forecasting in End-Of-Life Spare Parts Procurement", Master's Thesis—Helsinki University of Technology System Analysis Laboratory, Jul. 27, 2007.
Kim, Bowon et al., Optimal Pricing, EOL (End of Life) Warranty, and Spare Parts Manufacturing Strategy Amid Product Transition, European Journal of Operation Research, vol. 188, pp. 723-745, 2008 [Initially published online May 1, 2007].
Klein, et al., "A Constant-Utility Index of the Cost of Living", The Review of Economic Studies, pp. 84-87, vol. XV-XVI, Kraus Reprint Corporation, New York, 1960.
Klein, et al., "An Econometric Model of the United States: 1929-1952", North-Holland Publishing Company, Amsterdam, 1955, pp. 4-41.
Klein, Lawrence R., "The Keynesian Revolution", New York, The MacMillan Company, 1947, pp. 56-189.
Krupp, James A.G.; "Forecasting for the Automotive Aftermarket"; The Journal of Business Forecasting Methods & Systems; Winter 1993-1994; 12, 4; ABI/Inform Global; pp. 8-12.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lapide, Larry, "New Developments in Business Forecasting", The Journal of Business Forecasting, pp. 12- 14, Spring 2002.
LendingTree.com, "Lender Ratings & Reviews," http://web.archive.org/web/20091015043716/http://www.lendingtree.com/lender-reviews/, Oct. 15, 2009, in 21 pages.
Li et al., "Automatic Verbal Information Verification for User Authentication", IEEE Transactions on Speech and Audio Processing, vol. 8, No. 5, Sep. 2000, pp. 585-596.
Lobo, Jude, "MySAP.com Enterprise Portal Cookbook," SAP Technical Delivery, Feb. 2002, vol. 1, pp. 1-13.
Loshin, Intelligent Enterprise: Better Insight for Business Decisions, "Value-Added Data: Merge Ahead", Feb. 9, 2000, vol. 3, No. 3, 5 pages.
Manilla, http://www.manilla.com/how-it-works/ printed Feb. 5, 2014 in 1 page.
McNamara, Paul, "Start-up's pitch: The Envelope, please," Network World, Apr. 28, 1997, vol. 14, No. 17, p. 33.
Medick et al., "German Agency to Mine Facebook to Assess Creditworthiness", Jun. 7, 2012, http://www.spiegel.de/interna-

(56) References Cited

OTHER PUBLICATIONS tional/germany/german-credit-agency-plans-to-analyze-individual-facebook-pages-a-837539.html printed Nov. 22, 2013 in 2 pages.
MicroBilt, "PRBC Credit Reporting Agency—Payment Reporting Builds Credit," http://www.microbilt.com/nontraditional-credit-report.aspx and corresponding "Sample Report," retrieved from http://www.microbilt.com/pdfs/PRBC%20Sample%20Report%20(complete).pdf printed Nov. 21, 2013 in 8 pages.
Microfinance Africa, "Philippines: Microfinance Players to get Their Own Credit Info Bureau," Apr. 5, 2011, http://microfinanceafrca.net/microfinance-around-the-world/philippines-microfinance-players-to-get-their-own-credit-info-bureau/ printed Nov. 22, 2013 in 2 pages.
Microsoft, "Expand the Reach of Your Business," Microsoft Business Solutions, 2004, in 16 pages.
Miller, Joe, "NADA used-car prices go online", Automotive News, Jun. 14, 1999, p. 36.
Mint.com, http://www.mint.com/how-it-works/ printed Feb. 5, 2013 in 2 pages.
Moore, John R., Jr. "Forecasting and Scheduling for Past-Model Replacement Parts" Management Science, Application Series, vol. 18, No. 4, Part 1, Dec. 1971, pp. B200-B213.
"Mosaic" (geodemography), available from http://en.wikipedia.org/wiki/Mosaic (geodemography), as last modified Jul. 13, 2012. pp. 4.
Mvelopes, http://www.mvelopes.com/ printed Feb. 5, 2014 in 2 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directoy.westlaw.com/scope/default.asp?db=NA-ALL&RS=W&VR=2.0 as printed Dec. 17, 2009, pp. 5.
Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.
Packer, A. H., "Simulation and Adaptive Forecasting an Applied to Inventory Control", Operations Research, vol. 15, No. 4, pp. 660-679, Jul. 1965.
"Parse", Definition from PC Magazine Encyclopedia, http://www/pcmag.com/encyclopedia_term_0,2542,t=parse&i=48862,00.asp as downloaded Mar. 5, 2012.
PersonalCapital.com, http://www.personalcapital.com/how-it-works printed Feb. 5, 2014 in 5 pages.
Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Ponniah, Paulraj, "Data Warehousing Fundamentals: A Comprehensive Guide for It Professionals", Wiley-Interscience Publication, pp. 257-289, 377-397, Aug. 3, 2001.
Porter, G. Zell, "An Economic Method for Evaluating Electronic Component Obsolescence Solutions", Retrieved from the web at www.gidep.org/data/dmsms/library/zell.pdf, May 1998, pp. 1-9.
"PostX to Present at Internet Showcase", PR Newswire, Apr. 28, 1997, pp. 2.
PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
"PremierGuide Announces Release 3.0 of Local Search Platform", Business Wire, Mar. 4, 2004, Palo Alto, CA, p. 5574.
"Qualifying for Debt Settlement", http://www.certifieddebt.com/debt/settlement-qualifications.shtml printed Jan. 9, 2013 in 2 pages.
Rahm, et al. "Data Cleaning: Problems and Current Approaches", Bulletin of the IEEE Computer Society Technical Committee on Data Engineering, Dec. 2000, vol. 23, No. 4, pp. 11.
Raman, et al., "Potter's Wheel: An Interactive Data Cleaning System", Proceedings of the 27th VLDB Conference, Roma, Italy, 2001, pp. 10.
"Resolve Debt for Less: With Help from Freedom Financial" http://www.debtsettlementusa.com/ printed Jan. 9, 2013 in 6 pages
Roos, Gina, "Web-Based Service Helps OEMs Cure Parts Obsolescence Blues", Electronic Engineering Times, p. 86, Oct. 8, 2001, Dialog 09056737 78968668.
Santarini, Michael, "Forecasts the Probable Obsolescence of Components—Module Predicts Parts Life", Electronic Engineering Times, Jan. 11, 1999, p. 48(1), Dialog 0607160353548246.
SAS, "SAS® Information Delivery Portal", Fact Sheet, 2008, in 4 pages.
Sawyers, Arlena, "NADA to Offer Residual Guide", Automotive News, May 22, 2000, p. 3.
Sax, Michael M., Data Collection and Privacy Protection: An International Perspective, Presentation: Managing Online Risk and Liability Conference, Aug. 31, 1999, pp. 58.
Schneier, B. "Applied Cryptography", John Wiley & Sons, Second Edition, pp. 435-447, 1996.
"Settling Your Debts—Part 1 in Our Debt Settlement Series", http://www.creditinfocenter.com/debt/settle_debts.shtml printed Jan. 9, 2013 in 6 pages.
ShoeBoxed, https://www.shoeboxed.com/sbx-home/ printed Oct. 16, 2012 in 4 pages.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
Stallings, W. "Cryptography and Network Security Principles and Practice", Prentice Hall, Second Edition, pp. 295, 297, Jul. 15, 1998.
Stone, "Linear Expenditure Systems and Demand Analysis: An Application to the Pattern of British Demand", The Economic Journal: The Journal of The Royal Economic Society, Sep. 1954, pp. 511-527, vol. LXIV, Macmillan & Co., London.
Sullivan, Laurie, "Obsolete-Parts Program Thriving", EBN, Manhasset, Issue 1296, p. 26, Jan. 2002, ProQuest 10 101195090.
Tao, Lixin, "Shifting Paradigms with the Application Service Provider Model"; Concordia University, IEEE, Oct. 2001, Canada.
Various Posts from the http://www.2p.wrox.com Forums: http://web.archive.org/web/2005045221950/http://p2p.wrox.com/topic.asp?TOPIC_ID=6513 , dated Nov. 15, 2003-Oct. 7, 2004.
"WashingtonPost.com and Cars.com launch comprehensive automotive web site for the Washington area", PR Newswire, Oct. 22, 1998.
Web Page posted at: http://web.archive.org/web20040805124909/http://www.oracle.com/technology/sample_codete/tech/pl_sql/htdocs/x/Case/start.htm, pp. 1 and 4 of the webpages posted on Jan. 7, 2003.
Web Pages printed Nov. 2, 2004 of Internet Draft entitled "Tunneling SSL Through a WWW Proxy", Luotonen, Ari, Netscape Communications Corporation (Dec. 14, 1995); 4 pages, http://muffin.doit.org/docs/rfc/tunneling.sub.--ssl.html.
Webpage printed out from http://www.jpmorgan.com/cm/ContentServer?c=TS_Content&pagename=jpmorgan%20Fts%2FTS_Content %2FGeneral&cid=1139403950394 on Mar. 20, 2008, Feb. 13, 2006, New York, NY.
Webpage printed out from http://www.fairisaac.com/NR/rdonlyres/AC4C2F79-4160-4E44-B0CB-5C899004879A/0/ScoreNetnetworkBR.pdf on Mar. 4, 2008.
Webster, Lee R., "Failure Rates & Life Cycle Costs", Consulting-Specifying Engineer; 23, 4; ABI/INFORM Global, Apr. 1998, p. 42.
Williams, Mark, "Results of the 1998 NASFAA Salary Survey", News from NASFAA, 1998.
Working, Holbrook, "Statistical Laws of Family Expenditure", Journal of the American Statistical Association, pp. 43-56, vol. 38, American Statistical Association, Washington, D.C., Mar. 1943.

(56) References Cited

OTHER PUBLICATIONS

Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
Declaration of Paul Clark, DSc. for Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) Filed Jan. 14, 2014 in 9 pages.
First Amended Complaint in Civil Action No. 2:12-cv-511-JRG (*Rpost Holdings, Inc. and Rpost Communications Limited* V. *Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited* V. *Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited* V. *Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.
Chiba et al., "Mobility Management Schemes for Heterogeneity Support in Next Generation Wireless Networks", 3rd EuroNGI Conference on, 2007, pp. 143-150.
International Search Report and Written Opinion in PCT Application No. PCT/US07/76152, dated Mar. 20, 2009.
Official Communication in Australian Patent Application No. 2012281182, dated Jul. 8, 2014.
Official Communication in Australian Patent Application No. 2012281182, dated May 19, 2015.
Official Communication in Chinese Patent Application No. 201280041782.2, dated Mar. 4, 2016.
Official Communication in European Patent Application No. 12811546.6, dated Nov. 25, 2014.
Official Communication in European Patent Application No. 12811546.6, dated Sep. 18, 2015.
Official Communication in Russian Patent Application No. 2014101674/08, dated Dec. 15, 2014.
International Search Report and Written Opinion for Application No. PCT/US2012/046316, dated Sep. 28, 2012.
International Preliminary Report on Patentability and Written Opinion for Application No. PCT/US2012/046316, dated Jan. 14, 2014.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US2010/034434, dated Jun. 23, 2010.
International Preliminary Report on Patentability for Application No. PCT/US2010/034434, dated Feb. 4, 2014.
International Search Report and Written Opinion for Application No. PCT/US2013/052342, dated Nov. 21, 2013.
International Preliminary Report on Patentability for Application No. PCT/US2013/052342, dated Feb. 5, 2015.

\* cited by examiner

PEER CHARACTERISTICS

| | CLIENT A | PEER 1 | PEER 2 | ... | PEER N | INDUSTRY AVG. |
|---|---|---|---|---|---|---|
| ACCOUNT WITH DISPUTE HISTORY | 32.86 % | 22.81% | 17.88 % | | 29.22 % | 29.41% |
| INACCURATE INFORMATION CLAIM | 25.20 % | 30.35 % | 29.88 % | | 29.22 % | 28.29 % |
| NOT HIS/HERS | 18.88 % | 26.39 % | 19.92 % | | 25.15% | 24.27 % |
| IDENTITY FRAUD CLAIM | 6.49 % | 5.23 % | 5.12 % | | 3.96 % | 4.67 % |
| CLAIMS ACCOUNT CLOSED | 5.78 % | 3.01 % | 1.56 % | | 4.11 % | 3.56 % |
| ACCOUNT INCLUDED IN BANKRUPTCY | 1.02 % | 0.54 % | 0.70 % | | 0.30 % | 0.54 % |
| DISPUTE ON PAYMENT DATES | 0.37 % | 0.43 % | 0.08 % | | 0.45 % | 0.22 % |
| ... | 0.01 % | 0.02 % | 0.00 % | | 0.03 % | 0.01 % |
| ACCOUNT INVOLVED IN LITIGATION | | | | | | |

FIG. 3

HOME > JOB MONITORING > CREDIT DB> DFA VENDORS > ACTION   FIG. 7A

| Home | Service Request | Client/Source Setup | Job Monitoring | System Monitoring | Contact Management |
|---|---|---|---|---|---|

CREDIT DB Polaris DFA - Vendor Setup

| General | Automotive | CEM | CREDIT DB | WIS |
|---|---|---|---|---|

Vendor Settings

[Save] [Clear Changes] [Submit]

VIN NAME

VIN * [M2UF]    Vendor Name* [Vendor A]
DFA Processing Status [Enabled ▼]    Vendor A

New Account Request

| | SR ID | Subcode | Request Date | Completion Date |
|---|---|---|---|---|
| details | 446 | 2222222 | 6/10/2014 11:15:16 AM | |
| details | 466 | 3994284 | 6/17/2014 10:25:45 AM | 6/17/2014 1:25:07 PM |
| details | 467 | 3994284 | 6/17/2014 1:32:13 PM | 6/17/2014 1:38:27 PM |

ISmart Settings

Setup ISmart

| | | | | | |
|---|---|---|---|---|---|
| Vendor Status | [Active] | Team Name | [NRC 1 PR] | | |
| Vendor Type | [ ] | Vendor Category | [Trade Contributor] | | |
| Metro Format | [2] | File Frequency | [Monthly] | | |
| Input Record Format | [FB] | Input Record Length | [1518] | Input Block Size | [27324] |

Deck [L2 ▼]

| | | | | | |
|---|---|---|---|---|---|
| Template | [GOGO1] | | | | |
| LA351 Record Format | [FB] | LA531 Record Length | [1518] | | |
| Block Descriptor Word | [N] | Header Date | [N] | Vendor Record Format | [02] |
| Vendor Type (Payment Grid) | [07] | Grid Automated Maintenance | [Y] | Mortgage Information | [1] |
| Activity Date to DOAI | [N] | Original Creditor Name | [N] | | |

| Preproc | Description |
|---|---|
| 1 CCLASRV2 | For stopping DP w/re18 so CEM sever can pick up file and return for processing - Handle both VB + FB files. |

DFA Services and Settings

| DFA Service | Processing Mode | Request Backfill | Processing Notes |
|---|---|---|---|
| Amount Field Based Stops | [Stop ▼] | | Operation Service, Additional Settings Required. If CII cleanse is turned on all AFBS processing will be Stop processing. |
| CII Cleanse | [Off ▼] | | Operation Service, Requires custom processing Requires CII Cleanse |
| Credit Reporting Resource Guide | [On ▼] | | Change DFA Processing Status to Turn On or Off. This contracts all DFA processing |
| Pre-process title before DFA | [Off ▼] | | Operation Service, Requires custom processing Request ProProc |
| Reformat Files | [Off ▼] | | Operation Service, Requires custom processing Request Reformat |
| Audit | [On ▼] | | Analytics Service for Metro2 only |
| Collections | [Off ▼] | | Analytics Service |
| FACTA 312 Reporting | [Off ▼] | | Analytics Service, Additional Settings Required |
| Mortgage | [On ▼] | | Analytics Service |
| New Account Metrics | [Off ▼] | | Analytics Service for Metro2 format 2 or C decks only |

HOME > JOB MONITORING > CREDIT DB> DFA VENDORS > ACTION

| Home | Service Request | Client/Source Setup | Job Monitoring | System Monitoring | Contact Management |

CREDIT DB Polaris DFA - Vendor Setup

Amount Field Based Stop processing

Stop Processing Decks
Add Stop Pre-Proc to Deck  [-Select-▼]

| | Deck |
|---|---|
| ☐ | L2 |
| ☐ | L2 |

[Delete Checked]

Email notification

[_____] [Add Email]

Note: Multiple emails can be entered as a ??? separated list

NAME@EMAIL.COM
                                                      [Remove Email]

Status Code, CCC and SCC Filters
Default Account Code Inclusion Filters : LOC. REV
Default Status Code Exclusions Filters : 64,DA, DF, 13, 97, 98, 93
Default CCC Exclusion Filters : XA
Default SCC Exclusion Filters : M, N

[ Add Filters ]

Cross Field Analysis
☐ Credit Limit is equal to High Balance
   Threshold % [1]          Alert Record Minimum [1]
☐ Credit Limit is equal to Current Balance
   Threshold % [1]          Alert Record Minimum [1]
☐ Credit Limit is less to High Balance
   Threshold % [1]          Alert Record Minimum [1]
☐ Credit Limit is less then Current Balance
   Threshold % [1]          Alert Record Minimum [1]

Single Field Analysis
☐ Credit Limit is less then or equal $10
   Threshold % [1]          Alert Record Minimum [1]
☐ Credit Limit is 6 or more repetitive numbers
   Threshold % [1]          Alert Record Minimum [1]
☐ Current Balance has 6 or more repetitive numbers
   Threshold % [1]          Alert Record Minimum [1]
☐ Highest Credit has 6 or more repetitive numbers
   Threshold % [1]          Alert Record Minimum [1]

100% of the Records with Same Values Single-Field Analysis
☑ Credit Limit
   Submittal Record minimum   [1]
☑ Current Balance
   Submittal Record minimum   [1]
☑ Highest Credit
   Submittal Record minimum   [1]

Historical Ratio Analysis
☑ Credit Limit
   Threshold % [1]   Alert Record Minimum [1]   Change % [1]
☑ Current Balance
   Threshold % [1]   Alert Record Minimum [1]   Change % [1]
☑ Highest Credit
   Threshold % [1]   Alert Record Minimum [1]   Change % [1]

FIG. 7B-1

| Comment Log | | |
|---|---|---|
| Comment* | | |
| Author | Date | Comment |
| | 4/5/2013 1:00:15 PM | Removed all alerts except Credit Limit is equal to high balance. |
| Author F | 4/4/2013 1:55:21 PM | removed all the emails except me. |
| Author F | 4/4/2013 1:50:11 PM | selected all alerts |
| Author F | 12/5/2012 2:49:32 PM | stop |
| Author F | 11/7/2012 4:04:20 PM | selected only one component |
| Author F | 10/19/2012 9:58:42 PM | parallel |
| Author F | 9/28/2012 6:48:15 PM | added ray to email list |
| Author F | 9/28/2012 5:43:28 PM | set all the minimums to 1 |
| Author F | 9/28/2012 3:50:09 PM | stop mode |
| Author F | 9/28/2012 3:45:24 PM | analysis mode and no pre-proc needed |
| Author F | 9/28/2012 12:00:51 PM | Added Tom &amp; Janet email ids Set all the minimums to 1 |
| Author F | 9/28/2012 11:15:58 AM | test |
| Author F | 11/23/2011 3:05:26 AM | test |

[Save] [Clear Changes] [Submit]

FIG. 7B-2

HOME > JOB MONITORING > CREDIT DB> DFA VENDORS > ACTION

FIG. 8A

| Home | Service Request | Client/Source Setup | Job Monitoring | System Monitoring | Contact Management |
|------|-----------------|---------------------|----------------|-------------------|--------------------|

Job Monitoring

| General | Automotive | CEM | CREDIT DB | TDIS | WIS |
|---------|------------|-----|-----------|------|-----|

File One Polaris DFA - Job Monitoring - BT268003

Batch Job File Info

| | | | | | |
|---|---|---|---|---|---|
| VIN | M2UF | Vendor Name | Vendor A | Vendor Status | Active |
| Job ID | 6974 | Run ID and Type | L1 | | |
| Tracking Number | 1603 | Tracking Timestamp | 2014-09-25 10:54:29.548537 | Activity Date | 9/25/2014 |
| Metro Format | | File Frequency | | | |
| Input File | File X | Input Record Count | | | |
| Input Record Length | | Vendor Input Record Length | 1518 | | |
| Input Record Format | FB | Fake RDW | | | |
| OPS01_1 | N | OPS03_1 | 02 | | |
| OPS04_1 | 07 | OPS57_1 | N | | |
| OPS70_2 | 3 | OPS70_3 | Y | | |

DFA Services and Settings

| DFA Service | Processing Mode | Processing Notes |
|---|---|---|
| Amount Field Based Stops | Stop ▼ | Operation Service, Additional Settings Required. If CII cleanse is turned on all AFBS processing will to Stop processing. |
| CII Cleanse | Off ▼ | Operation Service, Requires custom processing Required CII Cleanse |
| Credit Reporting Resource Guide | On ▼ | Change DFA Processing Status to Turn On or Off. This contracts all DFA processing |
| Pre-process title before DFA | Off ▼ | Operation Service, Requires custom processing Request ProProc |
| Reformat Files | Off ▼ | Operation Service, Requires custom processing Request Reformat |
| Audit | On ▼ | Analytics Service for Metro2 only |
| Collections | Off ▼ | Analytics Service |
| FACTA 312 Reporting | Off ▼ | Analytics Service, Additional Settings Required |
| Mortgage | On ▼ | Analytics Service |
| New Account Metrics | Off ▼ | Analytics Service for Metro2 format 2 or C decks only |

Processing Details

Server Side Processing

| Step | Start Timestamp |
|---|---|
| DFA Processing Prep | |
| DFA Processing Start | |
| DFA DME Processing | |
| DFA Processing Complete | |
| Polling | 9/30/2014 2:03:20 PM |
| C.D Received | 9/30/2014 2:03:22 PM |
| C.D Submit | 9/30/2014 2:03:24 PM |

Mainframe Processing

| Step | Start Timestamp | End Timestamp | Return Code |
|---|---|---|---|
| MEDIA RECEIVED | 9/25/2014 10:54:15 AM | 9/25/2014 10:54:15 AM | 0000 |
| JCL BUILDER | 9/25/2014 10:54:25 AM | 9/25/2014 10:54:25 AM | 0000 |
| AUTO SCHEDULE DATAPREP | 9/25/2014 10:54:29 AM | 9/25/2014 10:54:29 AM | 0000 |
| EASYTRIEVE/EASYTRIEVE PLUS | 9/25/2014 10:54:37 AM | 9/25/2014 10:54:37 AM | 0018 |

HOME > JOB MONITORING > CREDIT DB> DFA VENDORS > ACTION

| Home | Service Request | Client/Source Setup | Job Monitoring | System Monitoring | Contact Management |

Job Monitoring

| General | Automotive | CEM | CREDIT DB | TDIS | WIS |

Credit DB Polaris DFA - Job Monitoring

Search

[Search] [Clear Fields]

Batch Information
- Batch Id:
- Job Id:
- VIN:
- Deck:

Activity Date:
- Begin:
- End:

Submittal Start Date:
- Begin:
- End:

Polling Date:
- Begin:
- End:

DFA Start Date:
- Begin:
- End:

JCL Upload Date:
- Begin:
- End:

DFA Completion Date:
- Begin:
- End:

Batch Jobs

| Job ID | Batch ID | VIN | Deck | Activity Date | iSmart Date | Polling Timestamp | DFA Start | LA351 JCL Upload | DFA Completion |
|---|---|---|---|---|---|---|---|---|---|
| 6990 | BT273029 | M2UF | L1 | 09/30/2014 | 09/30/2014 | 09/30/2014 | 09/30/2014 | | 09/30/2014 |
| 6989 | BT273028 | | L1 | 03/29/2013 | 09/30/2014 | 09/30/2014 | | | |
| 6988 | BT273026 | | L1 | 09/30/2014 | 09/30/2014 | 09/30/2014 | | | |
| 6987 | BT273025 | | L1 | 09/30/2014 | 09/30/2014 | 09/30/2014 | | | |
| 6986 | BT273024 | | L1 | 09/30/2014 | 09/30/2014 | 09/30/2014 | | | |
| 6985 | BT273023 | | L1 | 09/30/2014 | 09/30/2014 | 09/30/2014 | | | |
| 6984 | BT273022 | | L1 | 09/30/2014 | 09/30/2014 | 09/30/2014 | | | |
| 6983 | BT272047 | | L1 | 09/28/2014 | 09/28/2014 | 09/30/2014 | | | |
| 6982 | BT272046 | | L1 | 09/28/2014 | 09/28/2014 | 09/30/2014 | | | |
| 6981 | BT272045 | | L1 | 09/29/2014 | 09/29/2014 | 09/30/2014 | | | |
| 6980 | BT272044 | | L1 | 09/29/2014 | 09/29/2014 | 09/30/2014 | | | |
| 6979 | BT278009 | | L1 | 09/30/2014 | 09/30/2014 | 09/30/2014 | | | |
| 6978 | BT278007 | | L1 | 09/25/2014 | 09/25/2014 | 09/30/2014 | | | |
| 6977 | BT278006 | | L1 | 09/25/2014 | 09/25/2014 | 09/30/2014 | | | |
| 6976 | BT278005 | | L1 | 09/25/2014 | 09/25/2014 | 09/30/2014 | | | |
| 6975 | BT278004 | | L1 | 09/25/2014 | 09/25/2014 | 09/30/2014 | | | |
| 6974 | BT278003 | | L1 | 09/25/2014 | 09/25/2014 | 09/30/2014 | | | |

FIG. 8B-1

| LA351 Checkpoint | Post Upgrade | AFBS | CII Clean | CRRG | DFA PrepProc | Reformat | Audit | Collections | FACTA312 | Mortgage | New Accounts |
|---|---|---|---|---|---|---|---|---|---|---|---|
| | | Stop | Off | On | Off | Off | Off | Off | Off | Off | Off |
| | 09/30/2014 | | | | | | | | | | |
| | | Stop | Off | On | Off | Off | Off | Off | Off | Off | Off |
| | | Stop | Off | On | Off | Off | On | On | Off | Off | Off |
| | | Stop | Off | On | Off | Off | On | Off | Off | Off | Off |
| 09/30/2014 | | Stop | Off | On | Off | Off | On | On | Off | Off | Off |
| 09/30/2014 | | Stop | Off | On | Off | Off | On | On | Off | Off | Off |
| 09/29/2014 | | Stop | Off | On | Off | Off | On | On | Off | Off | Off |
| | | Stop | Off | On | Off | Off | Off | Off | Off | Off | Off |
| 09/29/2014 | | Stop | Off | On | Off | Off | On | On | Off | Off | Off |
| 09/29/2014 | | Stop | Off | On | Off | Off | Off | Off | Off | Off | Off |
| | | Stop | Off | On | Off | Off | On | On | Off | Off | Off |
| | | Stop | Off | On | Off | Off | Off | Off | Off | Off | Off |
| 09/29/2014 | | Stop | Off | On | Off | Off | Off | Off | Off | Off | Off |
| | | Stop | Off | On | Off | Off | Off | Off | Off | Off | Off |
| | | Stop | Off | On | Off | Off | Off | Off | Off | Off | Off |
| | | Stop | Off | On | Off | Off | Off | Off | Off | Off | Off |

Total Records: 17

FIG. 8B-2

SERVER ARCHITECTURE FOR ELECTRONIC DATA QUALITY PROCESSING

PRIORITY INFORMATION

This application claims priority to U.S. Provisional Patent Application No. 61/910,892, filed on Dec. 2, 2013, entitled "Data Quality Monitoring Systems and Methods," which is hereby incorporated by reference herein in its entirety.

BACKGROUND

Data quality is a critical component of large-scale data processing and storage. If data furnishers submit erroneous or outdated data to a data processing and storage system, such submissions may be in violation of the Fair Credit Reporting Act (FCRA) section 623 and result in inaccurate analyses and decisions.

SUMMARY OF THE DISCLOSURE

In one embodiment, a server architecture for data quality processing is provided. The server architecture may include a primary system configured to electronically communicate with a set of data furnisher systems, to access encrypted data sets of a data furnisher which include account data for a plurality of the data furnisher's consumers, and to communicate with a large-scale credit data store storing billions of records; a data format manager module configured to electronically communicate with the primary system to access the encrypted data sets, to decrypt the encrypted data sets, and to format the data sets to conform with or determine the data set already conforms with a first predetermined format and generate decrypted, processed data sets; a data loader module configured to electronically communicate with the data format manager module to access the decrypted processed data sets and external data and make them available for analysis; a configuration and control module configured to access data furnisher-specific instructions specific to the data furnisher from a data furnisher information database, to use the data furnisher-specific instructions to select a set of services and metrics to run on the corresponding data furnisher's descripted, processed data, to instruct the data loader module to make the corresponding data furnishers' decrypted, processed data available for analysis; an analysis module configured to access the data furnisher's decrypted, processed data set, to perform the selected set of services and metrics on the decrypted, processed data set to automatically generate data quality indicators which represent the quality of the data in the decrypted processed data set, to generate an analytics result data package based on the performed services and metrics and generated data quality indicators, and to store the analytics result data package in an analytics database; and a reporting application configured to electronically communicate with the analytics database and provide electronic access to a system of the data furnisher, to electronically create report displays, benchmarking displays, and metric displays by querying the analytics result data package, and to enable access of the report displays, the benchmarking displays, and the metric displays to the system of the data furnisher.

In another embodiment, a computer-implemented method of evaluating quality of data received from a furnisher is provided. The computer-implemented method may include, as implemented by one or more computing devices configured with specific computer-executable instructions, accessing a data set of a data furnisher for updating a large-scale credit database; formatting the data set to conform to or determining that the data set already conforms with a predetermined format; obtaining configuration information specific to the data furnisher; obtaining historical records of the data furnisher that are related to the data set; analyzing the data set and the obtained historical records, in accordance with the obtained configuration information, to calculate one or more indices that represent quality of the data set; generating a data quality report, the data quality report including at least one of the calculated one or more indices; and generating an instruction to allow the data set to be added to the credit database if the calculated one or more indices meet a predetermined criterion.

In a further embodiment, a non-transitory computer storage medium storing computer-executable instructions that direct a computing system to perform operations is provided. The operations may comprise: accessing a data set of a data furnisher for updating a large-scale credit database; formatting the data set to conform to or determining that the data set already conforms with a predetermined format; obtaining configuration information specific to the data furnisher; obtaining historical records of the data furnisher that are related to the data set; analyzing the data set and the obtained historical records, in accordance with the obtained configuration information, to calculate one or more indices that represent quality of the data set; generating a data quality report, the data quality report including at least one of the calculated one or more indices; and generating an instruction to allow the data set to be added to the credit database if the calculated one or more indices meet a predetermined criterion

BRIEF DESCRIPTION OF DRAWINGS

Specific embodiments will be described with reference to the following drawings.

FIGS. 3, 4, 5, and 6 are embodiments of electronic displays that show example peer comparisons.

FIG. 7A is an embodiment of an electronic display showing interfaces for data furnisher setup.

FIG. 7B depicts a sample embodiment of an electronic display showing interfaces for data furnisher setup.

FIG. 8A is an embodiment of an electronic display showing interfaces for job monitoring.

FIG. 8B depicts a sample embodiment of an electronic display showing interfaces for job monitoring.

DETAILED DESCRIPTION OF EMBODIMENTS

Figure 1:
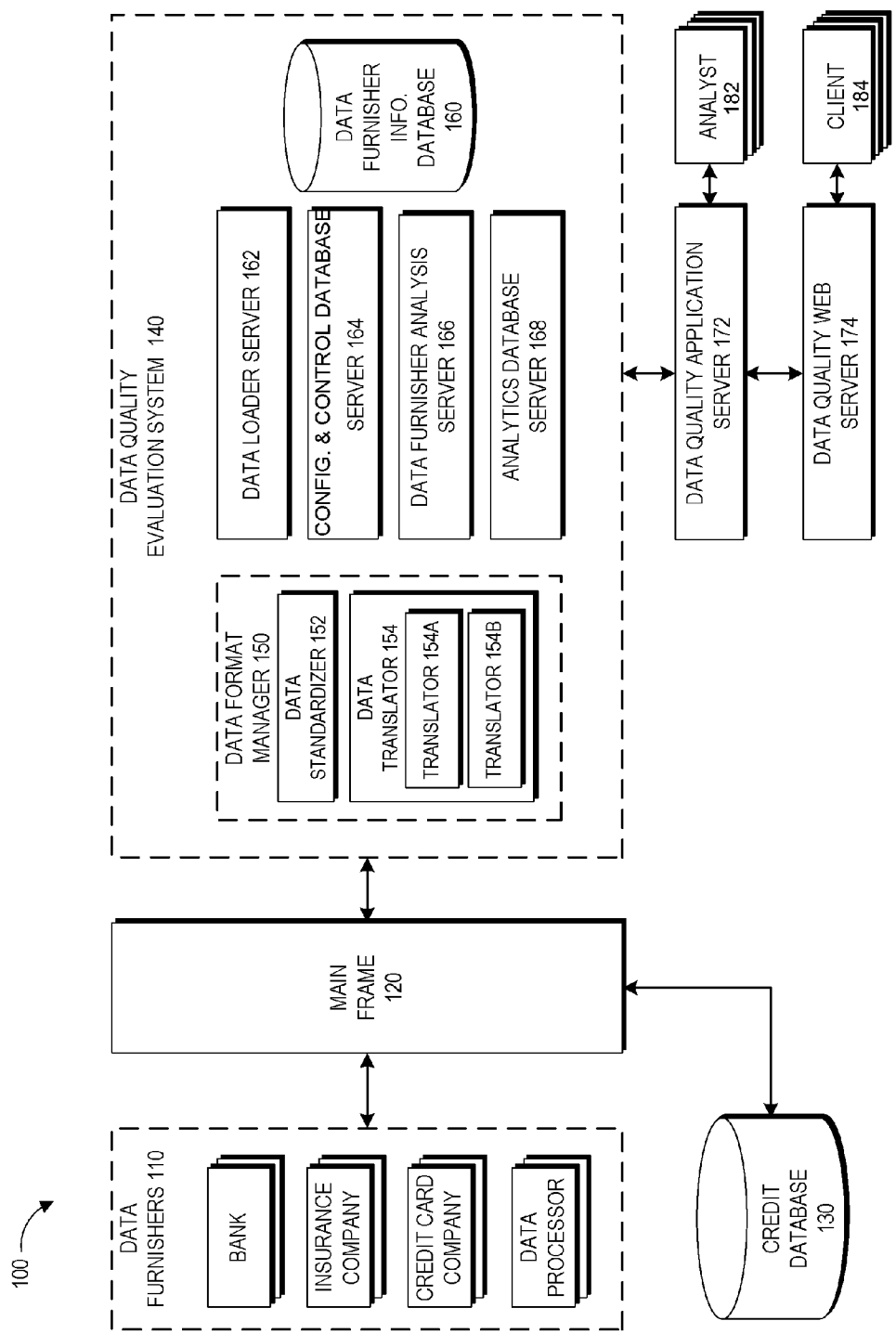
FIG. 1 is a block diagram depicting one embodiment of an architecture for data quality analysis.

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features, no single one of which is solely responsible for its desirable attributes or which is essential to practicing the embodiments of the disclosure herein described. For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

I. Overview

Data quality is a critical component of industries that provide services based on analyses of large sets of data. Often, the data is collected from various external sources and then stored in a central location. In such situations, the quality of the centrally stored data is directly dependent on the quality of the collected data. If the collected data includes a significant number of errors or other inaccuracies, then the analyses performed on the collected data can be adversely affected. For example, inaccurate data provided by data furnishers to a credit bureau may result in incorrect credit decisions, issues for consumers/creditors/retailers, and/or complaint disputes with consumers.

For data furnishers, it would be beneficial and help with compliance to have a system that can automatically monitor and assess the quality of the data they provide to other entities, such as credit bureaus. This system could assist data furnishers in complying with quality-related regulations, maintaining a competitive edge over other data furnishers, reducing the number of consumer disputes, and/or increasing their trust levels with their consumers as well as entities that use and rely upon their data. Similarly, for data collectors managing large data stores (inclusive of warehouses and platform repositories), it would be beneficial to have a system to assist the data collectors in ensuring that their large data stores meet required regulations or guidelines and allow them to flag poor quality, incoming data before it is added into to their data stores.

In one embodiment, a data quality system provides modules for automatically aggregating data related to data furnishers and their consumers, analyzing dispute reporting data, generating data quality reports based on information related to a data furnisher, providing benchmarking analyses that compare a data furnisher with other data furnishers in similar peer groups, computing data trend analyses, generating and updating business rules to improve data quality, and/or conducting simulation and impact analyses. The data quality system may also include various modules to allow for report generation, automated notifications, visualization tools, peer information dashboards and displays, simulation tools, as well as other interfaces that allow data furnishers or analysts to access, interact with, customize, and utilize the system.

A benefit of some embodiments is that the data quality system is able to perform the analyses and/or review without having to sacrifice main processing capacity. Such embodiments are better than other designs that might require running an analysis on the same server as the main data prep and loading processes. Those other designs either sacrifice main processing capacity to perform the analysis functions or require significant investment into the existing technology that is typically more expensive than the parallel analytical system used by embodiments of the data quality system disclosed herein. In addition, the data quality system avoids having to develop a single, entire main processing solution, which would require significant additional development (estimated over 1 year) and a very large hardware and software systems expense related to that undertaking.

Data Aggregation

In some embodiments, the data quality system may access and/or review data from a variety of sources including, for example, data from the data furnishers, credit bureau data, dispute data, processing statistics, segmentation data, and historical data quality analysis metrics data, which may include historical metric summaries for data furnishers as well as individual metrics for particular records. The data from the data furnisher may include data in a standard format, such as Metro 1 and Metro 2, for example. The credit bureau data may include a sample set of extracted aggregated data, which excludes any personally identifiable information. The disputed data may include data from an entity that collects and processes credit data disputes. The data may include current as well as historical data for a set period of time, such as 1 month, 3 months, 6 months, 1 year, 3 years, and so forth. The system can analyze the quality of the data furnisher's data sets based on the collected information. A data quality report, including a data quality index or score for the data furnisher and its data sets, can also be provided by the system. The score may, for example, include an indication of a fatal error rate percentage and be included on one of the reports.

Dispute Reporting

In some embodiments, the data quality system may review dispute data and link subsets of the data to specific data furnishers as well as specific account types. The data quality system can then run statistics on the linked data to determine, for example, metrics on a specific furnisher or metrics on specific account type of a furnisher. This data can then be used to compare a data furnisher to other peer data furnishers.

Benchmarking

In some embodiments, the data quality system provides benchmarking analyses and reports that allow a data furnisher to understand not only its own reporting practices, but also where it stands against the industry and its peer groups. Data furnishers are then able to understand where they currently stand, as well as how enhancements that they may make will likely trend based on historical reporting and continued peer review. The benchmarking may include both data and dispute reporting reviews providing information on: reporting inconsistencies, such as incomplete consumer information or invalid values or discrepancies in data, portfolio review of on-file data, identification of dispute trends, as well as analyses of response rates, response times, and/or actions taken.

In some embodiments, an identifier for the data furnisher may be related to a company identifier, as a single company may have multiple entities that provide data. The data for the data furnisher can then be tied to the company identifier and compared to other sets of data related to company identifiers of other companies or data furnishers in the same category. This allows the identity of each of the other data furnishers to be masked and anonymized for benchmarking reports. In addition, the benchmarking data may be presented as metrics via percentages and ratios rather than absolute numbers to avoid inadvertently revealing the identity of other data furnishers.

In some embodiments, the benchmarking and/or peer data is presented via an electronic dashboard interface and allows for viewing of the information as well and visualizations of the data and/or analysis.

Data Trending and Analysis

In some embodiments, the data quality system analyzes the data for a single furnisher or a group of furnishers to determine trends in the data quality, whether positive or negative. Information about trending for outlier performance may also be provided, which lends itself to credibility to the system. The data quality system may also provide statistics on the specific trends as well as other metrics. The system may also utilize historical data to compare a data furnisher's current results with the data furnisher's prior results. A set of results that greatly departs from the historical data may indicate a problem with the current data set. In addition, the current result may indicate that the data furnisher's quality is on an incline or a decline or that a particular metric that is out of range for the data furnisher.

Business Rules

In some embodiments, the data quality system generates new business rules or edits to existing business rules that would assist a data furnisher in improving its data quality. The system may also identify which rules would have the most impact.

Simulation and Impact Analysis

In some embodiments, the data quality system also provides simulation tools to allow a data furnisher to see what would happen to its data quality if one or more of the business rules were implemented or revised. The system may also indicate that first X rules, if implemented, would improve data quality by 34% whereas the other remaining rules would collectively only improve data quality by 1%.

II. Data Quality Evaluation Architecture

FIG. 1 is a block diagram depicting one embodiment of an architecture 100 for data quality analysis by a data quality system. The architecture 100 shown in FIG. 1 includes data furnisher systems 110, a mainframe 120, a credit database 130, a data quality evaluation system 140, a data quality application server 172, and a data quality web server 174. In one embodiment, the systems may communicate via one or more networks, which may include one or more of a local area network, a wide area network, the Internet, or a cloud-computing network, implemented via a wired, wireless, or combination of wired and wireless communication links.

Data Furnisher Systems

In one embodiment, the data furnisher systems 110 include server systems associated with a variety of data furnishers, sometimes referred to as vendors. The data furnishers may include banks, insurance companies, credit unions, credit card companies, collection agencies, or other entities that provide their customer data to large data stores, such as a credit bureau. The data furnishers may also include data processors that collect and process data from other financial institutions and companies and then provide the collected data to a large data store, such as a credit bureau. The exemplary data furnisher systems 110 electronically communicate with the mainframe 120 to make their respective data sets available to the data quality evaluation system 140. The data may be provided via a variety of data transfer technologies such as push, pull, file transfer protocol, secure file transfer protocol, secure copy, a virtual private network, and so forth. In addition, the data may be provided in a variety of formats. For example, it may be provided in a raw format or it may be encrypted using one or more existing encryption technologies or other technologies that allow for a secure transfer. The data sets may then be processed by other computing systems including the data quality evaluation system 140, for analyzing the quality of the data sets, updating credit information stored in the credit database 130, or updating information in the data furnisher information database 160.

The data furnisher systems 110 may utilize a variety of data formats for their own, internal purposes. As such, data transmitted from the data furnisher systems 110 to the mainframe 120 may include data in various formats depending on the data furnisher or even the type of data that is being provided. In some embodiments, the data sets from the data furnisher systems 110 may include data in a standard industry format, such as Metro 1 or Metro 2, for example. In other embodiments, the data set from the data furnisher systems 110 may include data in furnisher internal formats or variations on standard formats. As discussed further below, the data set from the data furnisher systems 110 may be standardized and formatted by the data format manager 150 before being analyzed by the data quality evaluation system 140.

In some embodiments, an identifier representing the data furnisher can be associated with, or included in, the data set from the data furnisher. An identifier may also be used to indicate the type of data being provided. For example, the data from Bank 123 (identifier 73A8) may include mortgage data (identifier M) along with automobile loan data (identifier A). Using theses identifiers, the data quality evaluation system 140 can identify origin of the data and/or the type of data, conduct data furnisher-specific analyses, conduct data type-specific analyses, conduct comparative analysis for different data furnishers or data types, and generate data quality reports for specific data furnishers. In certain embodiments, the data furnishers and/or a subset of the data, can be organized into subgroups for comparative analysis among the subgroups of the data furnishers.

Mainframe

In one embodiment, the mainframe 120 is configured to act as an intermediary system among the data furnisher systems 110, the credit database 130, and the data quality evaluation system 140. While the term mainframe is used herein, it is recognized that this component of the system may be implemented as another system or computing device, such as a non-mainframe server. The mainframe 120 is a gateway for facilitating electronic communication between the data quality evaluation system 140 and the data furnisher systems 110. Data sets from the data furnisher systems 110 can then be transmitted to the data quality evaluation system 140 via the mainframe 120. In addition, in one embodiment, the credit database 130 can be updated with data sets received from the data furnishers systems 110 via the mainframe 120.

The data sets may be received by the mainframe 120 at different times, or may be received simultaneously. As discussed above, the data sets may include a large variety of data types, such as consumer data, business data, real property data, unstructured transaction data, and/or other types of data. The mainframe 120 may be capable of receiving large data sets, such that each set of data received from a given data furnisher may include millions of records, where each record may be associated with a different individual, business, property, account or other entity.

Credit Database

The exemplary credit database 130 is a large data store that is configured to store and manage credit information of customers of financial institutions, which includes data received from third party data furnishers. The credit database 130 may be a large-scale database that includes account data for millions or even billions of customers, where each customer identified in the data may have one or more accounts. The credit database 130 may be based on several sources of data which include existing trade data, new trade data, inquiries, public record data (for example, bankruptcy filings), change of address data, demographic data, and so forth. A common type of credit data is "tradeline data", sometimes referred to as trade data. Tradeline data may be an entry by a credit grantor to a consumer's credit history, which is maintained by a credit-reporting agency in a credit database 130. Tradelines provide information about a consumer's account status and activity and can include names of companies with which the consumer has accounts, dates the accounts were opened, credit limits, types of accounts, account balances, payment histories, and/or other data. The information in the credit database 130 may be used to evaluate credit of a person or a company, to resolve financial disputes. This information can also be updated based on the data sets from the data furnisher system 110 after the data is processed, reviewed and evaluated by the data quality evaluation system 140. The terms "consumer," "customer," "people," "persons," "individual," "party," "entity," and the like, whether singular or plural, should be interpreted to include either individuals or groups of individuals, such as, for example, married couples or domestic partners, organizations, groups, business entities, non-profit entities, and other entities.

Data Quality Evaluation System

In one embodiment, the data quality evaluation system 140 is configured to evaluate and generate indications of the quality of the data sets received from the data furnishers 110. The exemplary data quality evaluation system 140 includes the data format manager 150, the data furnisher information database 160, the data loader server 162, the configuration and control database server 164, the data furnisher analysis server 166, and the analytics database server 168.

To conduct data quality analysis, the data quality evaluation system 140 is configured to access data sets of data furnishers, process the data sets, access information related to the data furnishers, calculate data quality indexes for the data set, and/or generate data quality index reports based on the calculated data quality indexes. In some embodiments, the data quality indexes include statistical information derived from the data sets of the data furnishers and/or a metrics representing absolute or relative qualities of the respective data set. Business rules may be used to conduct various analyses, such as evaluating data set quality against industry standards or internal standards, or other metrics gained from experience, practice, and/or logic. The business rules may depend on the specific data, data type, furnisher, or other factors such that analysis some fields may work for some analyses, while other fields may work for other analyses. In one embodiment, the data quality evaluation system 140 is also configured to generate new business rules or update existing business rules that would assist the data furnishers in improving their data reporting quality. Some example rules include determining if status codes values are logical for specific date field values, if balances are logical compared to credit limit, if critical fields (for example, date of birth) are complete and if so are they logically valid (for example, not future), if certain criteria have been met to indicate fatal errors along with the reasons for the fatal errors.

Data Format Manager

In one embodiment, the data format manager 150 is configured to process data sets received from the data furnishers 110 via the mainframe 120 and transform the data into a standard format that can be analyzed by the system. The exemplary data format manager 150 includes a data standardizer module 152 and a data translator module 154 used to convert the data of the data furnishers to a format that can be analyzed by the data quality evaluation system 140. In some embodiments, the data format manager 150 may divide a data set into subgroups based on the data types for data type specific analysis.

The data standardizer module 152 is configured to convert the data into a general standardized format that is used by the data quality evaluation system 140. For example, if the data quality evaluation system 140 uses variation 1 of the Metro 2 standard, data received in the Metro 1 format or in variation 2 of the Metro 2 standard is converted to be in the variation 1 of the Metro 2 standard. As another example, if the data quality evaluation system 140 uses proprietary format Y, then data received in any Metro 1 or Metro 2 format is converted to be in the proprietary standard Y format.

The data translator module 154 is configured to undo or roll back furnisher-specific changes or customized elements that have been made by the data furnishers' to their own data sets to put their data sets into the standard formats. Accordingly, the data translator module 154 may include data furnisher specific sub-translator modules 154A, 154B that are configured to process data from specific corresponding data furnishers. For example, Bank A may vary slightly from variation 2 of the Metro 2 standard format, and Credit Card Company B may vary slightly from variation 4 of the Metro 2 standard format. The data translator 154 may have a translator 154A that is specific to Bank A configured to translate the data received from Bank A into the standard variation 2 of the Metro 2 standard format. Similarly, the data translator 154 may have a translator 154B that is specific to Credit Card Company B configured to translate the data received from Credit Card Company B into the standard variation 4 of the Metro 2 standard format. Moreover, if a new data furnisher wants to submit data and has its own customizations to a standard industry format, a new sub-translator module can be generated specific to the new data furnisher.

Once translated into the standard format, the data standardizer module 152 may convert the standardized data into the specific format used by the data quality evaluation system 140. For example, if the data quality evaluation system 140 uses proprietary format Y, then the data standardizer module 152 may convert Bank A's data, which is now is in the format of variation 2 of the Metro 2 standard format, into the proprietary format Y and convert Credit Card Company B's data, which is now in the format of variation 4 of the Metro 2 standard format, into the proprietary format Y. Thus, the data sets from both Bank A and Credit Card Company B are now in the proprietary format Y and can be analyzed by the data quality evaluation system 140.

Data Furnisher Information Database

In one embodiment, the data furnisher information database 160 is a data store configured to store and manage configuration, requirements, preferences and instructions specific to the data furnishers. The data furnisher information database 160 may also include prior data quality evaluation results of the data furnishers, historical records of the data furnishers, previous data quality indices and reports generated during past data quality evaluations that have been performed for specific data furnishers. For example, the data furnisher information database 160 may store information on which services and metrics to run for Bank A. It may also include information on which historical analyses that have been run for Bank A, along with Bank A's instruction to always run specific benchmarking reports on its mortgage data and specific benchmarking reports that should be excluded on its automobile loan data.

Data Loader Server

In one embodiment, the data loader server 162 is configured to load and prepare data sets for analysis. The data loader server 162 may comprise one or more servers which access and receive data sets using a variety of techniques and on various schedules, such as in real-time, hourly, daily, weekly, monthly, and so forth.

As noted above, the data quality evaluation system 140 can analyze a variety of data associated with data furnishers including: incoming data from data furnishers often via the mainframe 120, information extracted from the credit database 130, aggregated dispute data collected from credit data dispute entities, processing statistics associated with the data furnisher, and configuration information from the data furnisher information database 160, which identifies the specific data furnisher-specific and/or data type specific analyses to be conducted. Thus, the data loader server is configured to electronically communicate with internal and external systems to access data used for the analyses. The data loader server 162 may also run other processes to prepare the data for the data quality analyses. For example, the data loader server 162 may be configured to anonymize credit information from the credit database 130 by excluding identification associated with the credit information and anonymize information of the data furnishers for peer data quality review among the data furnishers. The data loader server 162 can also generate statistical information (for example, industry average metrics) and metrics, such as the sizes of the data sets and schedules during which they were loaded. While the data loader server 162 may load data for analysis by the data furnisher analysis server 166, it also recognized that data may be loaded by other components, such as the mainframe, the credit database 130, as well as other external or remote systems.

Configuration and Control Database Server

In one embodiment, the configuration and control database server 164 is configured to manage and control the analyses of the data furnisher's data sets. The configuration and control database server 164 may check the mainframe for inbound data, review the received data and/or the information stored in the data furnisher information database 160 to determine which services and metrics to run for a specific data set, instruct the data loader servers 162 to load the appropriate data, and/or instruct the data furnisher analysis server 166 to conduct the appropriate analyses and metrics. In some embodiments, the configuration and control database server 164 is configured to electronically communicate with the data quality application server 172 and/or the data quality web server 174 to receive instructions from the clients 184 or the analysts 182 to modify or update data furnisher-specific data and store the updates or modifications in the data furnisher information database 160.

Data Furnisher Analysis Server

In one embodiment, the data furnisher analysis server 166 is configured to analyze the formatted data sets of the data furnishers 110 according to the instructions and parameters given by the configuration and control database server 164 in order to evaluate the quality of the data sets. The data furnisher analysis server 166 may also be configured to calculate metrics and/or indexes representing the quality of the data sets in absolute or relative terms. The metrics may be calculated on individual records, but may also be calculated based on aggregated data sets or subsets. In addition, the data furnisher analysis server 166 may be configured to generate a message indicating that a particular set of data has passed a quality metric and can be added to or released into the large data store or that a particular set of data has not passed a quality metric such that the data provider should be notified and/or the data set should not be added into the large data store.

In some embodiments, the data furnisher analysis server 166 also conducts comparative or benchmarking analyses for generating electronic peer review reports such that the data furnishers can understand not only their own data reporting practices, but also where they stand among their peer groups or in the industry. The peer review reports may include both data and disputes reporting reviews. The peer review reports may also provide information on reporting inconsistencies (incomplete consumer information, invalid values, discrepancies in data), portfolio review of data stored in the credit database 130, trends regarding disputes, as well as data furnisher response information, such as response rates, response times, and actions taken.

In some embodiments, the data furnisher analysis server 166 is configured to generate analytics associated with a single data furnisher (or a group of data furnishers) to determine trends in data quality using historical data quality information. The determined trends can be utilized for initiating processes to send notifications to data furnishers of possible problems or discrepancies or to update business rules of the data furnishers to improve data quality.

In some embodiments, the data furnisher analysis server 166 is configured to load the results of the analyses, metrics, benchmarking comparisons, and so forth onto the analytics database server 168.

Analytics Database Server

In one embodiment, the analytics database server 168 is configured to store the results of the analyses, metrics, benchmarking comparisons, and so forth from the data furnisher analysis server 166. In some embodiments, the analytics database server 168 is configured to provide a quick response time to queries and to electronically communicate with the data quality application server 172 and the data quality web server 174 to provide information (for example, statistical, graphical, reporting, summary, and so forth) to the data furnishers and analysts.

Data Quality Application Server and Data Quality Web Server

In one embodiment, the data quality application server 172 is configured to electronically communicate with the analytics database server 168 to provide data quality analytics, metrics, reports, and other requested data to the analyst systems 182. In one embodiment, the data quality web server 174 is a web server that is configured to electronically communicate with the analytics database server 168 to provide data quality analytics, metrics, reports, and other requested data to the data furnisher client systems 184 via a web-based interface. While FIG. 1 includes a web server to allow communication with the data furnisher client systems 184, it is recognized that other servers may be used to provide such information. For example, the data furnishers may communicate with the data quality evaluation system 140 via a downloadable application or a non-web based portal.

In some embodiments, the data quality application server 172 and/or the data quality web server 174 may provide simulation tools to allow the analysts and/or data furnishers to see what may happen to data quality if one or more of the business rules are revised or if various conditions changed and may also provide various reporting tools and comparison graphs for use by the analysts and/or data furnishers. The data quality application server 172 and/or the data quality web server 174 may also allow for account set up, analysis configuration, service requests, job monitoring, system monitoring, and/or help requests.

It is recognized that in some embodiments, the data quality application server 172 and the data quality web server 174 may be implemented as a single server.

III. Data Quality Evaluation Processes

Figure 2A:
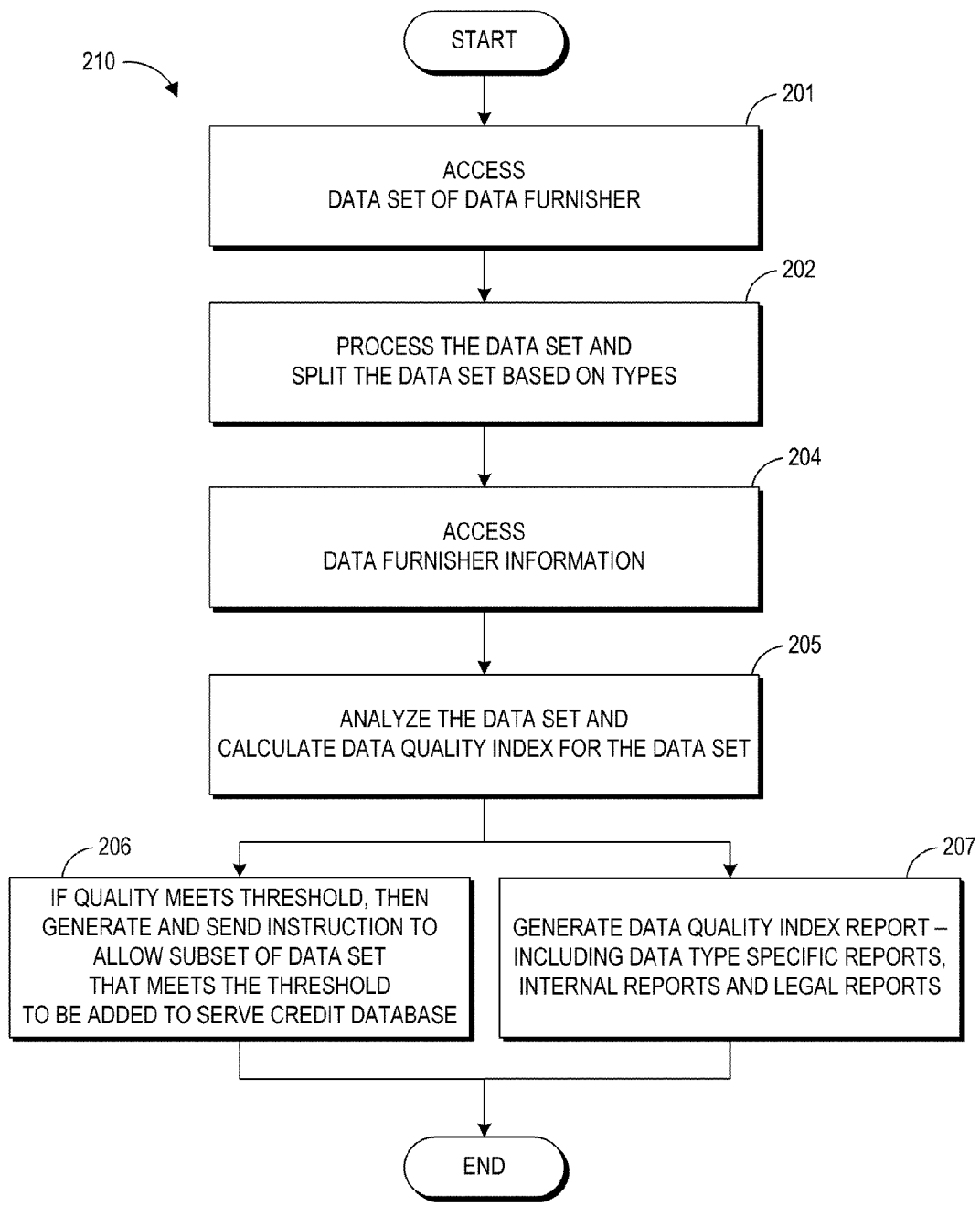
FIG. 2A is a block diagram illustrating one embodiment of a process for conducting data quality analysis.

FIG. 2A is a block diagram illustrating one embodiment of a process of conducting data quality analyses 210. At block 201, the process 210 accesses data sets received from the data furnisher systems 110. In some embodiments, the data quality evaluation system 140 accesses these data sets via the mainframe 120. In some embodiments, the data furnisher systems 110 collect data and report the collected data periodically to the mainframe 120 or other part of the data quality system 100. The collected data may include credit-related information about the data furnishers' customers. The collected data may include, for example, information about the opening and closing of financial accounts, financial disputes, fraud transaction claims for customers, bankruptcy data, credit limits, types of accounts, account balances, payment histories, and so forth.

At block 202, the process 210 processes the obtained data for further analysis. In one embodiment, the data quality evaluation system 140 formats and standardizes the data using the data format manager 150 as discussed above. The data quality evaluation system 140 may further process the data sets to organize them into subsets based on a variety of categories within the data. It is recognized that a data set may be divided into subsets based on categories of the data set such as data type, account type, status of associated accounts, data furnisher type, data furnisher, age of the data entries, and so forth. For example, the data set may come from a data processor and include data from five banks, which each have first mortgage accounts and equity line of credit accounts. The data can be categorized by bank and further subcategorized by mortgage accounts and line of credit accounts. This categorization allows the data quality evaluation system 140 to conduct category specific analyses for the various subsets in the data set as well as vendor or data provider-specific analyses.

At block 204, the process 210 accesses data furnisher information stored in the data furnisher information database 160. The data furnisher information may include instructions for which services and metrics to run for the data furnisher for each of the different data types, historical information representing prior data quality metrics for the same data furnisher or data types, statistical information derived from data reported by the specific data furnisher, and other information associated with the specific data furnisher.

At block 205, the process 210 conducts a data quality evaluation and analysis of the processed data. The data quality evaluation may be conducted in accordance with the data furnisher's instructions stored in the data furnisher information database 160. The data quality evaluation system 140 calculates the requested one or more analyses and data quality metrics that represent the quality of the analyzed data set, which may include record-level metrics as well as an aggregation of metric data. The analyses may be based on the data furnisher, or they may also include comparative analyses using peer data.

At block 206, the process 210 generates any designated data quality reports that reflect the analyses and metrics calculated at block 206. The data quality reports can include result of comparative analysis, such as peer review, as well as data furnisher-specific summary and trend reports. The data quality reports may also be generated based on the data type, such that certain reports may be generated for mortgage data and other reports are generated for personal finance data. In addition, the data quality evaluation system 140 may provide suggestions for enhancing data quality and simulating of data quality if the suggestion is applied. The simulated data quality may be generated based on statistical analyses of the data furnishers' historical data quality as well as anonymized data from other data furnishers.

Figure 2B:
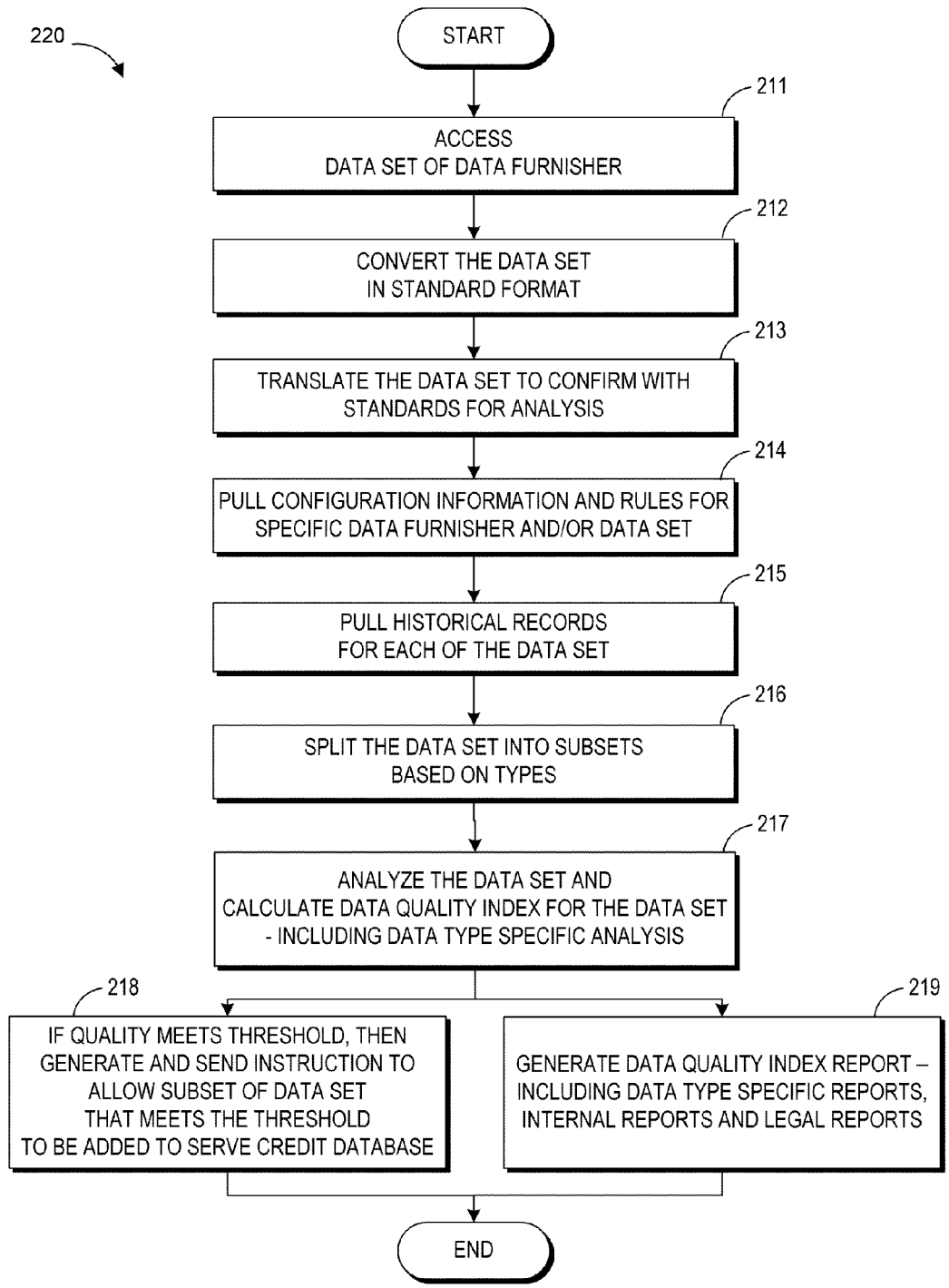
FIG. 2B is a block diagram illustrating another embodiment of a process for conducting data quality analysis.

FIG. 2B is a block diagram illustrating another embodiment of a process of conducting data quality analyses 220. At block 211, the process 220 accesses a data set of a data furnisher that is to be added to the credit database 130. For example, the data set may be from Credit Card Company B and include information on the customers' credit limits, recent updates on credit limits, unpaid balances, billing address updates, fraud transaction disputes, and so forth. In addition, the data set may include an identifier that corresponds to Credit Card Company B such that the data quality evaluation system 140 can identify the origin of the data set and conduct data furnisher-specific analysis using the identifier.

At blocks 212 and 213, the process 220 processes the data set to remove any data furnisher-specific changes and convert the data to the format used by the data quality evaluation system 140. The process 220 may exclude or ignore any data fields that are not used by the data quality evaluation system 140. For example, if the data set from the credit card company includes data about enrollment in a customer loyalty program as well as non-standard Metro 2 payment amount data, process 200 may eliminate the loyalty program information and modify the payment amount data to conform to standard Metro 2 format, variation 1.

At block 214, process 220 retrieves instructions, configuration information and for rules specific to the data furnisher, which may be stored in the data furnisher information database 160. The retrieved information may include data furnisher-specific (and/or data type specific) instructions for the data quality analyses. For example, Credit Card Company A may include specific configurations for evaluating fraud transaction disputes that are different from Credit Card Company B; and Collection Company C may not include any instructions for fraud transaction disputes since they may not be relevant to the collection company.

At block 215, the process 220 accesses historical records that correspond to the data set. The historical records may include previous metrics and/or analyses associated with the same data furnisher and/or the same data type, which may be stored in the data furnisher information database 160. The historical records may also include past anonymized peer data.

At block 216, the process 220 divides the data set into subsets based on categories of data within the data set, such as data type, account type, status of associated accounts, data furnisher type, data furnisher, age of the data entries, and so forth. For example, a data set from Bank A may include credit card account data and savings accounts data such that the data quality evaluation system 140 may divide the data set into two subgroups based on the account types for account type-specific analyses.

At block 217, the process 220 analyzes the subsets of the data set according to the configuration information and/or rules retrieved at block 214. Based on the analysis, the data quality evaluation system 140 may generate metrics or data quality indexes for the subsets of the data set.

At block 218, the process 220 determines whether the calculated data quality meets predetermined criteria so that it can be released and added to the credit database 130. By using predetermined criteria for updating credit database 130, the data quality evaluation system 140 prevents degradation of credit data quality by low quality data sets. In certain embodiments, the predetermined criteria may be set as a requirement that must be fulfilled before any data can be added to the credit database 130. For example, if the data quality analysis reveals that the data set reported by a data furnisher contains a certain level of suspicious data, the data quality evaluation system 140 may preclude the data set (and/or any data from the data furnisher) from being added to the credit database 130. In some embodiments, the predetermined criteria may include a requirement for data quality consistency by the data furnishers. For example, the data quality evaluation system 140 may preclude the data set from being added to the credit database 130 if sudden change of data quality is identified. For example, if the data set shows a very sharp increase in the numbers of data discrepancy disputes, the data set may be prevented from being added to the credit database 130 as that data set may include many potential discrepancies even though the data set meets another criterion regarding data integrity. It is recognized that the predetermined criteria may be different for different data furnishers as well as different for different data types.

At block 219, the process 220 generates data quality index reports for the data set and/or the data furnisher. The data quality index reports may include data furnisher-specific reports, data type-specific reports, internal reports, and/or legal reports. In certain embodiments, the data quality evaluation system 140 uses the analyses and reports to provide suggestions to a data furnisher to help enhance the data furnisher's data quality. Suggestions for enhancing data quality may include suggestion to update business rules and/or policies of the data furnisher or may flag problematic data types within the sets and/or potential third party data issues.

It is recognized that a variety of embodiments may be used to conduct data quality analyses and that some of the blocks above may be combined, separated into sub-blocks, and rearranged to run in a different order and/or in parallel. In addition, in some embodiments, the processes 210 and 220 may execute on the data quality evaluation system 140 and/or different blocks may execute on various components of the data quality evaluation system 140.

IV. Data Quality Evaluation Screen Displays

FIGS. 3, 4, 5 and 6 are embodiments of electronic displays that show example peer comparisons. In some embodiments, the displays may provide data quality information to the analyst systems 182 and/or the client systems 184.

In FIG. 3, the electronic display 310 shows peer comparison results, which include a list of peer characteristics 320 for which comparative analyses have been conducted among data furnishers within the same category. The peer characteristics include account dispute comparison and history of inaccurate information claim, closed account claim, identity fraud claim, payment date dispute, and so forth. The peer characteristics compare metrics of a specific data furnisher (Client A) 322, with metrics of other data furnishers (Peer 1, Peer 2, . . . Peer N) 324, along with the industry average 326. The peer comparisons do not reveal the actual identity of the other data furnishers.

Figure 4:
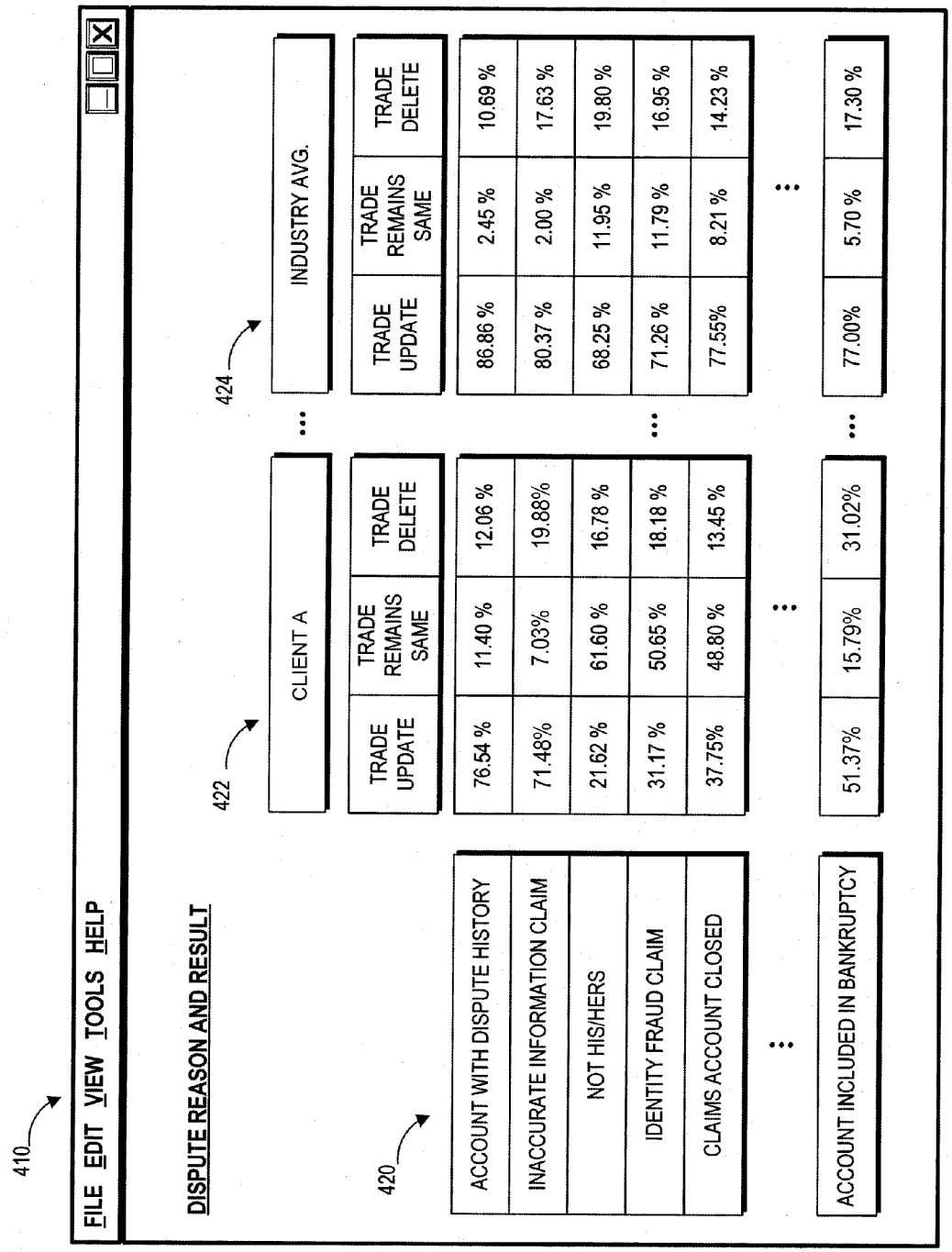

In FIG. 4, the electronic display 410 shows some results of data quality analyses for dispute reasons and results. The display 410 includes a list of dispute types 420 for which comparative analysis has been conducted for other data furnishers. The display 410 shows statistical information of dispute results associated with the data furnisher (Client A) 420 for each of the dispute types broken down by outcome, for example, Trade Update, Trade Remaining the Same, and Trade Delete. The display 410 also shows industry average of results 424 for the each of the same dispute types. While peers are not shown in FIG. 4, it is recognized that similar information could be provided for anonymized peers.

Figure 5:
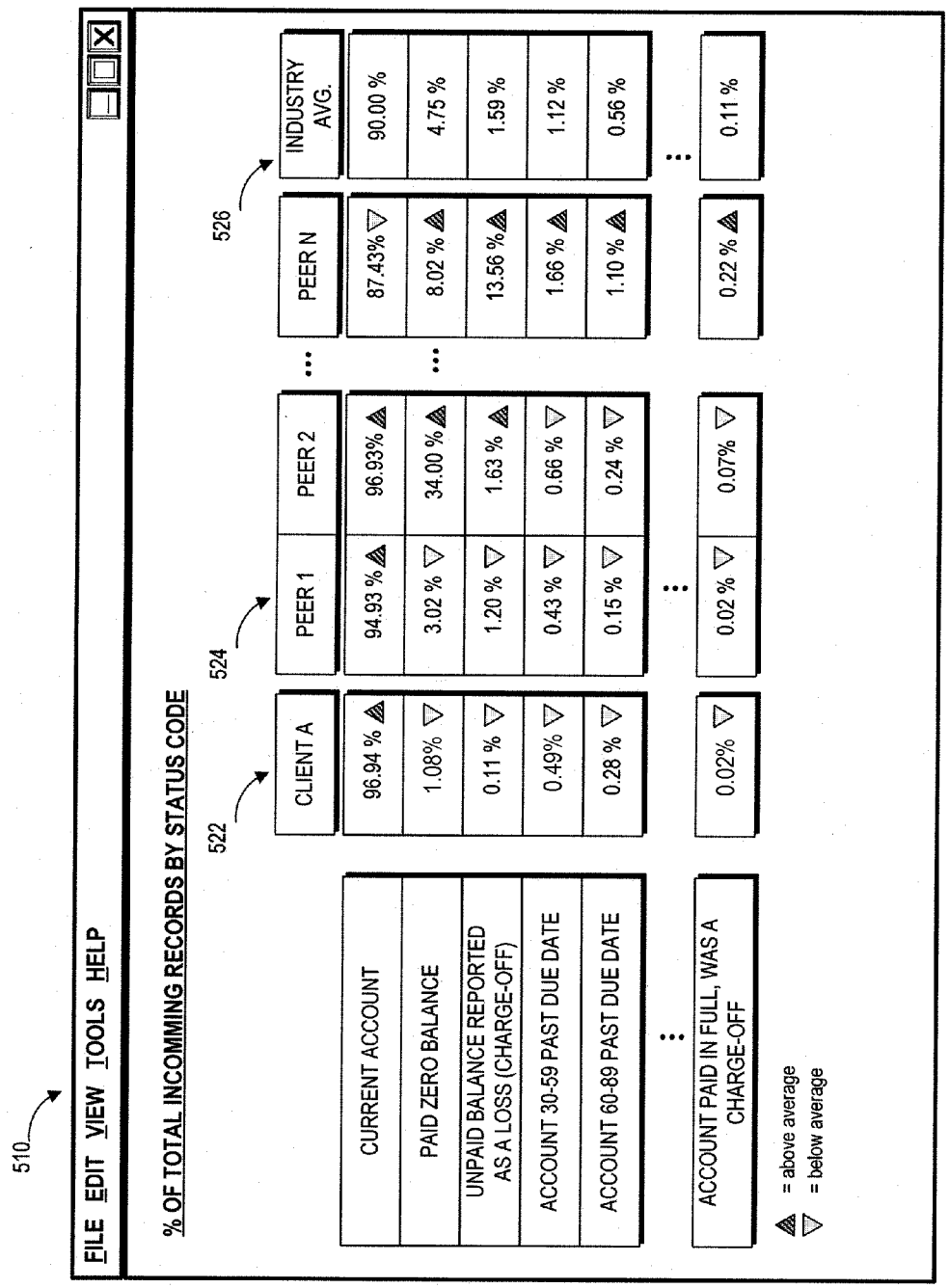

In FIG. 5, the electronic display 510 shows information regarding the percentage of the total incoming records broken down by status code. The display 510 includes statistical information regarding account status of the data furnisher (Client A) 522 and also includes statistical information regarding account status of other data furnishers (Peer 1, Peer 2, . . . Peer N) 524, along with the industry average. In addition, the display 510 includes visual objects (triangles) showing whether a specific status code is above or below the corresponding industry average.

Figure 6:
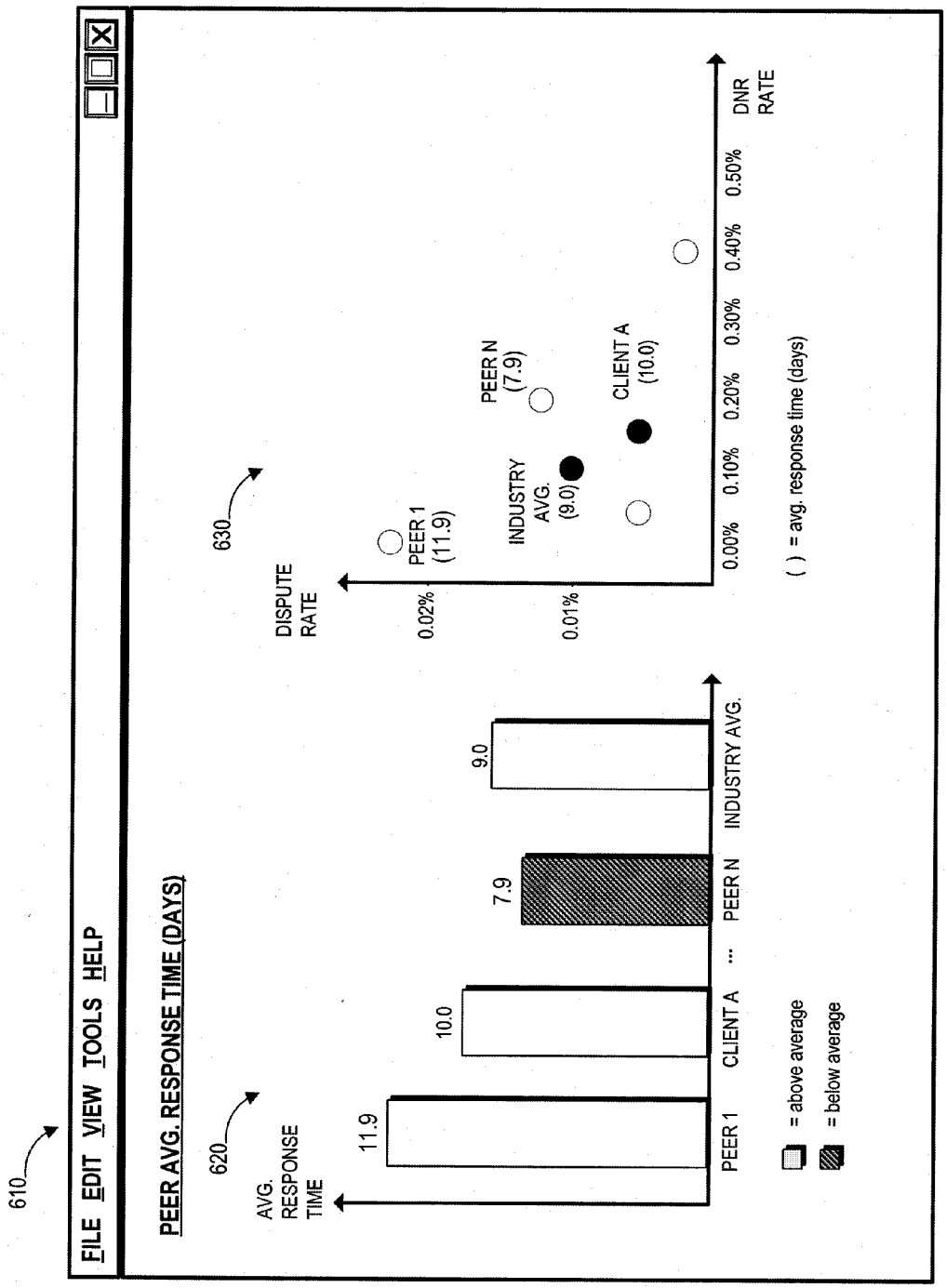

In FIG. 6, the electronic display 610 shows graphical representations of the average dispute response time 620 and dispute rate 630 for the data furnisher (Client A) along with other data furnishers (Peer 1 . . . Peer N) and the industry average.

Figure 7B:
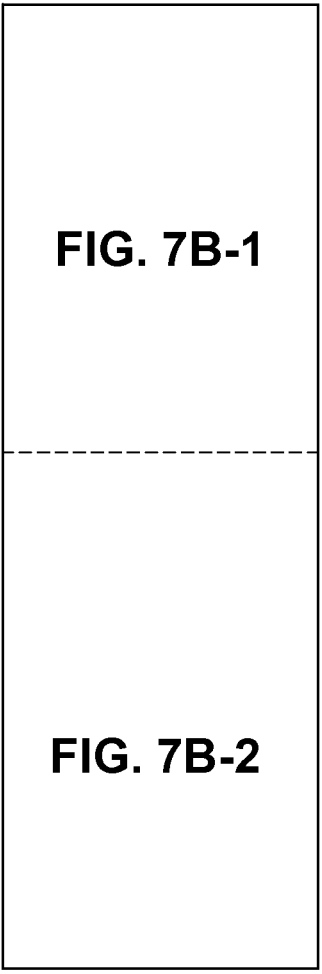
FIG. 7B has been split into two pages, FIG. 7B-1 and FIG. 7B-2, which together extend across two drawing sheets. For purposes of this specification, FIG. 7B-1 and FIG. 7B-2 will be treated as one figure, FIG. 7B.

FIGS. 7A and 7B are exemplary electronic displays showing interfaces or dashboards for data furnisher or vendor setup. Using the interfaces illustrated in FIG. 7A and FIG. 7B, various instructions and account information associated with data furnishers (vendors) for data quality evaluation can be displayed and updated. The instructions may include system set up, services and settings, configuration information, protocols, business rules, data formats, and limitations for data quality variation. In addition, an event log that provides information about previously run services and analyses may also be provided via the illustrated interfaces.

Figure 8B:
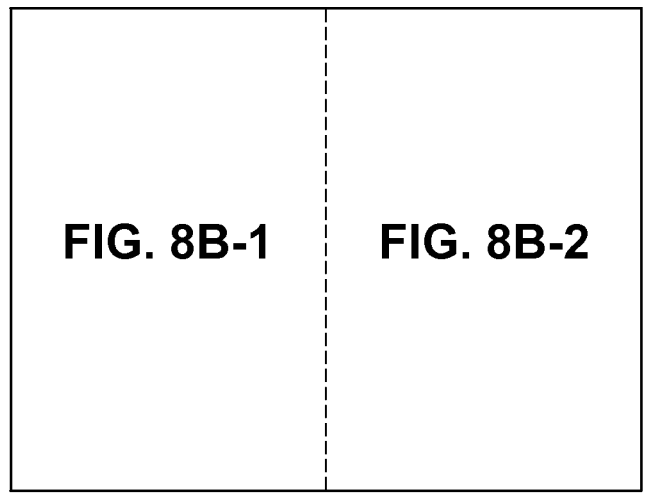
FIG. 8B has been split into two pages, FIG. 8B-1 and FIG. 8B-2, which together extend across two drawing sheets. For purposes of this specification, FIG. 8B-1 and FIG. 8B-2 will be treated as one figure, FIG. 8B.

FIGS. 8A and 8B are exemplary displays showing interfaces or dashboards for job monitoring. Current and prior data furnisher analysis services and the corresponding configuration information for a particular data furnisher are provided via the illustrated interfaces. The job information may include time stamps and log information for the data quality evaluations along with the specific settings that are being used for the current job, were used for previous jobs, and are set to be used for future jobs. With reference to FIG. 8B, an interface for searching for a prior job is provided on the left side of the display. On the right side of the display, the statuses of the current job along with prior jobs as well as future scheduled jobs are listed along with corresponding configuration information and/or status information.

V. Computing Systems

Figure 9:
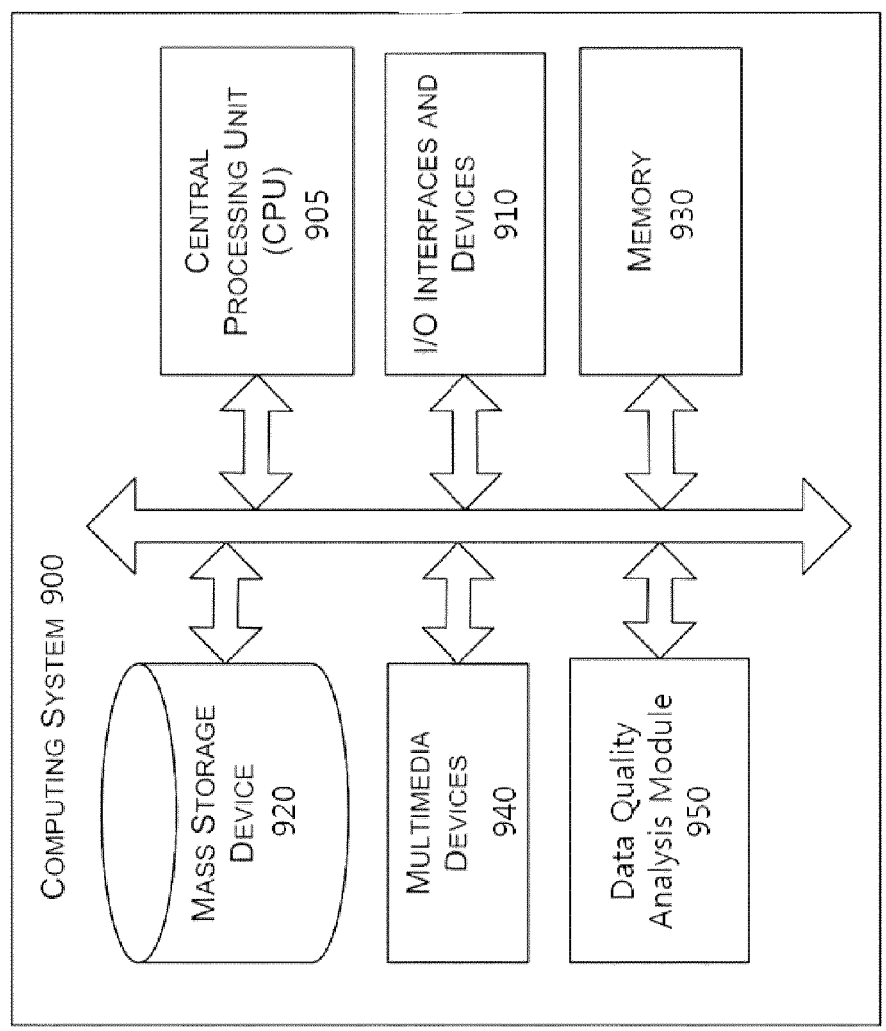
FIG. 9 is one embodiment of a block diagram of a computing system.

In some embodiments, any of the systems, servers, or components referenced herein may take the form of a computing system as shown in FIG. 9. FIG. 9 is a block diagram showing one embodiment of a computing system 900. The exemplary computing system 900 includes a central processing unit (CPU) 905, which may include one or more conventional microprocessors that comprise hardware circuitry configured to read computer-executable instructions and to cause portions of the hardware circuitry to perform operations specifically defined by the circuitry. The computing system 900 may also include a memory 930, such as random access memory (RAM) for temporary storage of information and a read only memory (ROM) for permanent storage of information, which may store some or all of the computer-executable instructions prior to being communicated to the processor for execution. The computing system may also include one or more mass storage devices 920, such as a hard drive, diskette, CD-ROM drive, a DVD-ROM drive, or optical media storage device, that may store the computer-executable instructions for relatively long periods, including, for example, when the computer system is turned off. Typically, the modules of the computing system are connected using a standard based bus system. In different embodiments, the standard based bus system could be Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of computing system may be combined into fewer components and modules or further separated into additional components and modules. The illustrated structure of the computing system 900 may also be used to implement other computing components and systems described in the disclosure. It is recognized that the components discussed herein may be implemented as different types of components. For example, a server may be implemented as a module executing on a computing device or a mainframe may be implemented on a non-mainframe server, a server or other computing device may be implemented using two or more computing devices, and/or various components could be implemented using a single computing devices.

In one embodiment, the computing system 900 comprises a server, a workstation, a mainframe, and a minicomputer. In other embodiments, the system may be a personal computer that is IBM, Macintosh, or Linux/Unix compatible, a laptop computer, a tablet, a handheld device, a mobile phone, a smart phone, a personal digital assistant, a car system, or a tablet. For example, a client may communicate with the data quality web server 174 via a tablet device and an analyst may communicate via a laptop computer. The servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth.

The computing system 900 may be generally controlled and coordinated by operating system software, such as Windows 95, Windows 98, Windows NT, Windows 2000, Windows XP, Windows Vista, Windows 7, Windows 8, Unix, Linux, SunOS, Solaris, Maemeo, MeeGo, BlackBerry Tablet OS, Android, webOS, Sugar, Symbian OS, MAC OS X, or iOS or other operating systems. In other embodiments, the computing system 900 may be controlled by a proprietary operating system. Conventional operating systems control and schedule computer processes for execution, perform memory management, provide file system, networking, I/O services, and provide a user interface, such as a graphical user interface (GUI), among other things.

The computing system 900 includes one or more commonly available input/output (I/O) devices and interfaces 910, such as a keyboard, mouse, touchpad, speaker, microphone, or printer. In one embodiment, the I/O devices and interfaces 910 include one or more display device, such as a touchscreen, display or monitor, which allows the visual presentation of data to a user. More particularly, a display device provides for the presentation of GUIs, application software data, and multimedia presentations, for example. The central processing unit 905 may be in communication with a display device that is configured to perform some of the functions defined by the computer-executable instructions. For example, some of the computer-executable instructions may define the operation of displaying to a display device, an image that is like one of the screenshots included in this application. The computing system may also include one or more multimedia devices 940, such as speakers, video cards, graphics accelerators, and microphones, for example. A skilled artisan would appreciate that, in light of this disclosure, a system including all hardware components, such as the central processing unit 905, display device, memory 930, and mass storage device 920 that are necessary to perform the operations illustrated in this application, is within the scope of the disclosure.

In the embodiment of FIG. 9, the I/O devices and interfaces provide a communication interface to various external devices and systems. The computing system may be electronically coupled to a network, which comprises one or more of a LAN, WAN, the Internet, or cloud computing networks, for example, via a wired, wireless, or combination of wired and wireless, communication link. The network communicates with various systems or other systems via wired or wireless communication links.

Information may be provided to the computing system 900 over the network from one or more data sources including, for example, data furnishers 110, mainframe 120, or a credit database 130. In addition to the systems that are illustrated in FIG. 1, the network may communicate with other data sources or other computing devices. The data sources may include one or more internal or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, or a record-based database.

In the embodiment of FIG. 9, the computing system 900 also includes a data quality analysis module 950, which may be executed by the CPU 905, to run one or more of the processes discussed herein. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, or variables. In one embodiment, the data quality analysis module 950 may include one or more of the modules shown in FIG. 1.

Embodiments can be implemented such that all functions illustrated herein are performed on a single device, while other embodiments can be implemented in a distributed environment in which the functions are collectively performed on two or more devices that are in communication with each other. Moreover, while the computing system has been used to describe one embodiment of a data quality system 100, it is recognized that the user systems may be implemented as computing systems as well.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, or may be invoked in response to detected events or interrupts. Software instructions may be embedded in firmware, such as an EPROM. It will be further appreciated that hardware modules may be comprised of connected logic units, such as gates and flip-flops, or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is recognized that the term "remote" may include systems, data, objects, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

VI. Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid-state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In addition, it is recognized that a feature shown in one figure may be included in a different display or interface, module, or system. Also, the reference numbers listed in the description are hereby incorporated by reference into the figures and the corresponding elements of the figures are deemed to include the corresponding reference numbers from the description.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might", or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The term "including" means "included but not limited to". The term "or" means "and/or".

Any process descriptions, elements, or blocks in the flow or block diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general-purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. For example, a feature of one embodiment may be used with a feature in a different embodiment. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A data quality review architecture platform for conducting an analysis of data quality within data sets provided by data furnishers for addition to a large-scale credit data store, the data quality review architecture comprising:
 a primary system configured to electronically communicate with a set of remote data furnisher systems, to access encrypted data sets of a data furnisher which include account data for a plurality of the data furnisher's consumers, and to communicate with a large-scale credit data store storing billions of records, wherein certain of the encrypted data sets include errors or inaccuracies and are potentially to be added to the large-scale credit data store;
 a data format manager module configured to electronically communicate with the primary system to access the encrypted data sets, to decrypt the encrypted data sets, and to format the data sets to conform with or determine the data set already conforms with a first predetermined format, and to generate decrypted, processed data sets;
 a data loader module configured to electronically communicate with the data format manager module to access the decrypted processed data sets and external data and make them available for analysis;
 a configuration and control module configured to:
  access data furnisher-specific instructions from a data furnisher information database,
  use the data furnisher-specific instructions to select a set of services for searching for errors or inaccuracies within the corresponding data furnisher's decrypted, processed data, to select a set of metrics to run on the corresponding data furnisher's decrypted, processed data, and
  instruct the data loader module to make the corresponding data furnishers' decrypted, processed data available for analysis,
  wherein the set of services for searching for errors or inaccuracies in the data set include at least one of: determining whether status code values are logical for specific date field values; determining whether balances are logical compared to one or more credit limits; determining whether one or more fields are complete and logically valid; determining whether certain criteria have been met indicating fatal errors associated with the data set;
 one or more application servers remote from the set of remote data furnisher systems and remote from the large-scale credit data store and configured to:
  access the data furnisher's decrypted, processed data set,
  execute the data furnisher-specific selected set of services and metrics on the decrypted, processed data set to automatically generate data quality indicators which represent a quality assessment of the data in the decrypted processed data set indicating a quantity of errors or number of inaccuracies within the decrypted, processed data set,
  generate an analytics result data package based on the performed services and metrics and generated data quality indicators, and to store the analytics result data package in an analytics database, and
  perform a determination on whether to allow the data set to be added to the large-scale credit data store based upon a comparison between the data quality indicators and one or more pre-determined data quality metrics related to the data furnisher; and
 a reporting application configured to electronically communicate with the analytics database to:
  provide electronic access to a remote data furnisher user system of the data furnisher to review information about the metrics and generated data quality indicators associated with the decrypted, processed data set of the data furnisher;
  electronically create report displays using the analytics result data package,
  electronically create benchmarking displays comparing the quantity of errors or the quantity of inaccuracies with those of one or more additional data furnishers associated with a peer group of the data furnisher for access by the remote data furnisher user system using the analytics result data package,
  electronically create metric displays using the analytics result data package, and
  enable access of the report displays, the benchmarking displays,
  and the metric displays to the remote data furnisher user system.

2. The server data quality review architecture platform of claim 1 wherein the reporting application is further configured to electronically communicate with a system of an analyst and to enable access of the report displays, the benchmarking displays, and the metric displays to the system of the analyst.

3. The data quality review architecture platform of claim 1, wherein the benchmarking displays do not indicate an identity of the one or more additional data furnishers associated with the peer group of the data furnisher.

4. The data quality review architecture platform claim 1, wherein the one or more application servers is further configured to access historical metric data related to the data furnisher and to use the historical metric data to perform the selected set of services and metrics on the data to automatically generate the data quality indicators.

5. The data quality review architecture platform claim 1, wherein the one or more application servers is further configured to automatically generate a suggestion to the data furnisher for enhancing the data furnisher's data quality based on the generated data quality indicators.

6. The data quality review architecture platform claim 5, wherein the one or more application servers is further configured to simulate a revised set of data quality indicators based on the automatically generated suggestion.

7. A computer-implemented method for conducting an analysis of data quality within a data set provided by a remote data furnisher for addition to a large-scale credit database, the computer-implemented method comprising:
 as implemented by one or more computing devices configured with specific computer-executable instructions,
 accessing a data set of a remote data furnisher for updating a large-scale credit database, wherein certain records of the data set includes errors or inaccuracies and are potentially to be added to the large-scale credit database;
 formatting the data set to conform to or determining that the data set already conforms with a predetermined format;

obtaining data furnisher-specific configuration information specific to the data furnisher from a data furnisher information database, the obtained data furnisher-specific configuration information used to select a set of services for searching for errors or inaccuracies and metrics to be run on the data set, wherein the set of services for searching for errors or inaccuracies in the data set include at least one of: determining whether status code values are logical for specific date field values; determining whether balances are logical compared to one or more credit limits; determining whether one or more fields are complete and logically valid; determining whether certain criteria have been met indicating fatal errors associated with the data set;

obtaining historical records of the data furnisher that are related to the data set;

at an application server system comprising one or more application servers and remote from the remote data furnisher and the large-scale credit database, analyzing the data set and the obtained historical records in accordance with the obtained data furnisher-specific configuration information to:

perform the selected set of services and metrics on the data set to automatically calculate one or more data quality indices that represent quality of the data set indicating a quantity of errors or quantity of inaccuracies within the data set, generate an analytics result data package based on the performed services and metrics and generated data quality indicators, and store the analytics result data package in an analytics database;

generating a data quality report, the data quality report including at least one of the calculated one or more data quality indices; and generating an instruction to allow the data set to be added to the large-scale credit database if the calculated one or more data quality indices meet a predetermined criterion.

8. The computer-implemented method of claim 7, wherein the data quality report includes a comparison between the one or more data quality indices of the data furnisher and corresponding data quality indices of at least one or more peer data furnishers.

9. The computer-implemented method of claim 8, wherein the data quality report does not reveal an actual identity of the at least one or more peer data furnishers.

10. The computer-implemented method of claim 7, wherein the configuration information includes at least one configuration that is specific to the data furnisher and wherein the data quality report includes at least one result of a data furnisher-specific analysis conducted based on the at least one data furnisher-specific configuration.

11. The computer-implemented method of claim 7, wherein the data furnisher-specific configuration information includes at least one configuration that is specific for at least one data type within the data set and wherein the data quality report includes at least one result of a data type-specific analysis conducted based on the at least one data furnisher-specific configuration.

12. The computer-implemented method of claim 7 further comprises automatically generating a suggestion to the data furnisher for enhancing data quality based on the calculated data quality indices.

13. The computer-implemented method of claim 12 further comprises simulating data quality of the data furnisher by implementing the generated suggestion.

14. A non-transitory computer storage medium storing computer-executable instructions that direct a computing system to perform operations for conducting an analysis of data quality within a data set provided by a remote data furnisher for addition to a large-scale credit database, the operations comprising:

accessing a data set of a remote data furnisher for updating a large-scale credit database, wherein certain records of the data set includes errors or inaccuracies and are potentially to be added to the large-scale credit database;

formatting the data set to conform to or determining that the data set already conforms with a predetermined format;

obtaining data furnisher-specific configuration information specific to the data furnisher from a data furnisher information database, the obtained data furnisher-specific configuration information used to select a set of services for searching for errors or inaccuracies and metrics to be run on the data set, wherein the set of services for searching for errors or inaccuracies in the data set include at least one of: determining whether status code values are logical for specific date field values; determining whether balances are logical compared to one or more credit limits; determining whether one or more fields are complete and logically valid; determining whether certain criteria have been met indicating fatal errors associated with the data set;

obtaining historical records of the data furnisher that are related to the data set;

at an application server system comprising one or more application servers and remote from the remote data furnisher and the large-scale credit database, analyzing the data set and the obtained historical records in accordance with the obtained data furnisher-specific configuration information to:

perform the selected set of services and metrics on the data set to automatically calculate one or more data quality indices that represent quality of the data set indicating a quantity of errors or quantity of inaccuracies within the data set, generate an analytics result data package based on the performed services and metrics and generated data quality indicators, and store the analytics result data package in an analytics database;

generating a data quality report, the data quality report including at least one of the calculated one or more data quality indices; and generating an instruction to allow the data set to be added to the large-scale credit database if the calculated one or more data quality indices meet a predetermined criterion.

15. The non-transitory computer storage medium of claim 14, wherein the data quality report includes a comparison between the one or more data quality indices of the data furnisher and corresponding data quality indices of at least one or more peer data furnishers.

16. The non-transitory computer storage medium of claim 14, wherein the data quality report does not reveal an actual identity of the at least one or more peer data furnishers.

17. The non-transitory computer storage medium of claim 14, wherein the data furnisher-specific configuration information includes at least one configuration that is specific to the data furnisher and wherein the data quality report includes at least one result of a data furnisher-specific analysis conducted based on the at least one data furnisher-specific configuration.

18. The non-transitory computer storage medium of claim 14, wherein the configuration information includes at least one data furnisher-specific configuration that is specific for at least one data type within the data set and wherein the data quality report includes at least one result of a data type-specific analysis conducted based on the at least one data furnisher-specific configuration.

19. The non-transitory computer storage medium of claim 14, further comprises automatically generating a suggestion to the data furnisher for enhancing data quality based on the calculated data quality indices index.

20. The non-transitory computer storage medium of claim 19, further comprises simulating data quality of the data furnisher by implementing the generated suggestion.

* * * * *